(12) United States Patent
Maruyama

(10) Patent No.: US 10,652,412 B2
(45) Date of Patent: May 12, 2020

(54) OPERATION CONSOLE, ELECTRONIC DEVICE AND IMAGE PROCESSING APPARATUS PROVIDED WITH THE OPERATION CONSOLE, AND METHOD OF DISPLAYING INFORMATION ON THE OPERATION CONSOLE

(71) Applicant: Sharp Kabushiki Kaisha, Osaka (JP)

(72) Inventor: Miyoko Maruyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/740,464

(22) Filed: Jun. 16, 2015

(65) Prior Publication Data
US 2015/0281479 A1 Oct. 1, 2015

Related U.S. Application Data

(63) Continuation of application No. 13/046,036, filed on Mar. 11, 2011.

(30) Foreign Application Priority Data

Mar. 23, 2010 (JP) .................................. 2010-065399

(51) Int. Cl.
*H04N 1/00* (2006.01)
*G06F 3/0488* (2013.01)
(Continued)

(52) U.S. Cl.
CPC ....... *H04N 1/00411* (2013.01); *G06F 3/0481* (2013.01); *G06F 3/0483* (2013.01);
(Continued)

(58) Field of Classification Search
CPC .... G06F 3/0481; G06F 3/0483; G06F 3/0488; G06F 3/04886; H04N 1/00482; H04N 1/00424; H04N 1/0044; H04N 1/004474
(Continued)

(56) References Cited

U.S. PATENT DOCUMENTS 4,431,870 A 2/1984 May et al.
5,620,608 A 4/1997 Rosa et al.
(Continued)

FOREIGN PATENT DOCUMENTS

JP 60-103444 A 6/1985
JP 63-231368 A 9/1988
(Continued)

OTHER PUBLICATIONS

Co-pending U.S. Appl. No. 13/046,036, filed Mar. 11, 2011 (current claims provided).

*Primary Examiner* — Jason M Mandeville
(74) *Attorney, Agent, or Firm* — Renner, Otto, Boisselle & Sklar, LLP

(57) ABSTRACT

On a touch-panel display of an image forming apparatus, which is divided to five areas, that is, a system area, a function selection area, a preview area, an action panel area and a task trigger area, pieces of information are displayed. Even if an operational mode is switched, the same or similar information is always displayed in the area arranged at the same position. In addition, when an input of a numerical value is requested, a group of keys of the same arrangement is displayed at the same position on the touch-panel display, regardless of the operational mode.

19 Claims, 11 Drawing Sheets

(51) Int. Cl.
*G06F 3/0481* (2013.01)
*G06F 3/0483* (2013.01)

(52) U.S. Cl.
CPC ........ *G06F 3/0488* (2013.01); *G06F 3/04886* (2013.01); *H04N 1/0044* (2013.01); *H04N 1/00384* (2013.01); *H04N 1/00424* (2013.01); *H04N 1/00474* (2013.01); *H04N 1/00482* (2013.01); *H04N 2201/0094* (2013.01)

(58) Field of Classification Search
USPC .................. 345/173–177; 715/700, 791, 864
See application file for complete search history.

(56) References Cited

U.S. PATENT DOCUMENTS

| | | | |
|---|---|---|---|
| 5,784,060 A | 7/1998 | Bertram et al. | |
| 5,978,477 A * | 11/1999 | Hull | G06Q 99/00 358/403 |
| 6,284,131 B1 * | 9/2001 | Hogard | A61M 1/16 210/143 |
| 6,577,907 B1 * | 6/2003 | Czyszczewski | H04N 1/00411 358/442 |
| 6,714,314 B1 * | 3/2004 | Ueda | G07F 17/26 358/1.1 |
| 6,724,492 B1 * | 4/2004 | Iwase | G06K 15/02 358/1.1 |
| 7,002,700 B1 * | 2/2006 | Motamed | H04N 1/00384 358/1.1 |
| 7,068,260 B2 * | 6/2006 | Hill | H04N 1/00413 345/156 |
| 7,170,629 B2 * | 1/2007 | Hull | H04N 1/00413 358/1.13 |
| 7,336,282 B2 | 2/2008 | Kato et al. | |
| 8,214,769 B2 | 7/2012 | Vialle et al. | |
| 8,265,510 B2 | 9/2012 | Okada et al. | |
| 8,452,337 B2 | 5/2013 | Kim | |
| 8,928,900 B2 * | 1/2015 | Tani | H04N 1/00411 358/1.13 |
| 2003/0043205 A1 * | 3/2003 | Hill | H04N 1/00413 715/810 |
| 2004/0080786 A1 * | 4/2004 | Hull | H04N 1/00413 358/1.16 |
| 2004/0141761 A1 | 7/2004 | Ikegawa | |
| 2005/0225540 A1 * | 10/2005 | Kawakami | G06F 3/04842 345/173 |
| 2005/0286924 A1 * | 12/2005 | Kurohata | G03G 15/5016 399/82 |
| 2006/0090993 A1 | 5/2006 | Park et al. | |
| 2006/0279810 A1 * | 12/2006 | Momose | H04N 1/0035 358/518 |
| 2007/0031162 A1 * | 2/2007 | Dombrowski | G03G 15/6508 399/81 |
| 2007/0216965 A1 | 9/2007 | Yoshihama | |
| 2007/0282974 A1 * | 12/2007 | Nagoshi | H04N 1/00244 709/217 |
| 2008/0062468 A1 | 3/2008 | Shouno | |
| 2009/0129574 A1 | 5/2009 | Erb | |

FOREIGN PATENT DOCUMENTS

| | | |
|---|---|---|
| JP | 9-265556 A | 10/1997 |
| JP | 11-133813 A1 | 5/1999 |
| JP | 2006-253989 A | 9/2006 |

* cited by examiner

OPERATION CONSOLE, ELECTRONIC DEVICE AND IMAGE PROCESSING APPARATUS PROVIDED WITH THE OPERATION CONSOLE, AND METHOD OF DISPLAYING INFORMATION ON THE OPERATION CONSOLE

CROSS-REFERENCE TO RELATED APPLICATION

This nonprovisional application claims priority under 35 U.S.C. § 119(a) on Patent Application No. 2010-065399 filed in Japan on Mar. 23, 2010, the entire contents of which are hereby incorporated by reference.

BACKGROUND OF THE INVENTION

Field of the Invention

The present invention relates to an operation console displaying information to a user and allowing the user to operate based on the information. More specifically, the present invention relates to an operation console displaying pieces of information on a plurality of divided areas that allows, even when an operational mode of an electronic device or an image processing apparatus provided with the operation console is changed and screen image thereof is changed accordingly, the user to accurately grasp numerical information for inputting a numerical value displayed in each operational mode. The present invention also relates to the electronic device and the image processing apparatus provided with the operation console, as well as to a method of displaying information on the operation console.

Description of the Background Art

As one type of image processing apparatuses as electronic equipment, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic operational modes such as a copy mode, a facsimile mode (hereinafter "facsimile" may also be denoted as FAX or fax), a network-supported printer mode and a scanner mode. In such an image forming apparatus, each user selects an operational mode and selects and makes settings of a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results on a sheet of recording paper. In such a situation, the operation panel, serving as an operation and display unit, functions as an interface between the image forming apparatus and the user. Generally, on the operation panel, a screen image for setting functions in each operational mode is displayed, so that the user can easily set various functions. Further, while a job is being executed, job progress status may be displayed, to allow the user to easily grasp the progress status of the job. In the printer mode executed upon reception of data from an external device, the job progress status may be displayed in accordance with the data received from the external device as a source.

Recently, a touch-panel display having a touch-panel formed on a liquid crystal panel (display panel) comes to be increasingly used as such an operation panel. By way of example, items (software buttons) allowing selection of a mode of the image forming apparatus are displayed on the touch-panel display, the user viewing the display presses a position of an item displayed on the touch-panel display (presses a software button), and the operational mode is set.

Such a touch-panel display having both the display and operation functions is advantageous in that it eliminates the necessity of providing a display unit and an operation unit separately. Further, it attracts attention recently since a command can be selected advantageously in accordance with the user's sense, when it is adapted such that a command can be selected in accordance with a trajectory of pressing of the touch-panel display by the user's finger. Examples of such command selection using finger trajectory include the following.

When a plurality of pages are displayed on the touch-panel display as print previews, the following operations may be performed. By a user operation of lightly tapping twice (hereinafter also referred to as double-tapping) a position of a certain page displayed as a preview, a command to display the page in an enlarged or reduced size can be selected. By a user operation trajectory of expanding a space between two fingers (hereinafter also referred to as pinch-out or pinch-open), a command to display the page in an enlarged size can be selected, and by a user operation trajectory of reducing a space between the two fingers (hereinafter also referred to as pinch-in or pinch-close), a command to display the page in a reduced size can be selected. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. It is noted that, strictly speaking, the tapping and double-tapping are not determined by the user operation trajectory on the touch-panel display (determined not by the trajectory but by detection of a position). The user's request, however, can also be detected by these operations and, therefore, these are also included in the gesture operations in the present specification.

Further, in the present specification, an operation other than the gesture operations as such will be described as a touch operation. The touch operation means an operation of detecting a user's request based on the position of operation by the user on the touch-panel. A representative example of the touch operation is an operation of the user pressing a position of an item (pressing a software button) displayed on the touch-panel display.

In an MFP provided with a touch-panel display allowing both touch operation and gesture operation, many pieces of information intended for the user are displayed on the touch-panel display. Such an MFP has a plurality of basic operational modes as described above, and the user selects an operational mode of the MFP. After selecting an operational mode, the user inputs various settings for the operational mode, and thereafter, inputs an image formation request. Such selection and input by the user are made by pressing software buttons displayed on the touch-panel display. Such an input operation may include input of the number of copies in the copy mode, and input of a telephone number of transmission destination in the FAX mode. Such an input operation may be done using numeric keys displayed on the touch-panel display.

By way of example, Japanese Patent Laying-Open No. 2006-253989 (hereinafter referred to as '989 Reference) discloses an image processing apparatus having an operation panel operating as a user interface provided on the body of image processing apparatus, and setting or instruction of an operation of the apparatus by the user is received using the operation panel. FIGS. 17, 18, 21, 22 and 24 of '989 Reference disclose the operation panel (touch-panel display) on which ten-key is displayed.

As disclosed in '989 Reference, in various electronic devices as represented by the image processing apparatus, a touch-panel display is provided as an operation console. On the touch-panel display, various pieces of information are displayed. One such information includes ten-key (numeric keys) disclosed in '989 Reference. Figures of '989 Reference show a touch-panel display on which ten-key (0-9, C (clear), * and #) is displayed.

In these figures, however, the ten-key (software buttons) is displayed at different positions. Therefore, unless the user remembers the position of the ten-key in each operational mode, it is necessary for the user to find the ten-key arranged at different positions in different operational modes and to input a process request. This leads to a problem that the user is confused, makes erroneous operation and takes longer time for operation.

SUMMARY OF THE INVENTION

In view of the foregoing, it is desirable to provide, in an electronic device and an image processing apparatus (image forming apparatus) that operate switching among a plurality of operational modes, a technique allowing the user to easily find the numerical information for inputting a numerical value required by the user, even when the operational mode is switched and the screen image on the operation console is changed accordingly.

According to an aspect, the present invention provides an operation console provided on an apparatus as an object of control, including: a display unit displaying information to be notified to a user; a detecting unit, arranged on the display unit, for detecting a request of the user based on a position touched by a finger tip of the user; and a display control unit displaying numerical information allowing the user for inputting, using the detecting unit, a numerical value as an instruction to the apparatus as the object of control, at the same position on the display unit even when display on the display unit is switched.

According to another aspect, the present invention provides a method of displaying information on an operation console provided on an apparatus as an object of control, including: the display step of displaying information to be notified to a user; the detecting step of detecting, using a touch-panel arranged on the display panel, a request of the user based on a position touched by a finger tip of the user; and the display control step of displaying numerical information allowing the user for inputting, using the touch-panel, a numerical value as an instruction to the apparatus as the object of control, at the same position on the display unit even when display on the display unit is switched.

By the operation console and the method of displaying information on the operation console, a numerical value to be instructed to the apparatus as the object of control is input by the user touching, with his/her finger tip, a portion of the detecting unit (touch-panel) on numerical information (information allowing input of a numerical value, such as the ten-key) displayed on the display unit (display panel). The numerical information is always displayed at the same position even when the display on the display unit (display panel) is switched. Therefore, even when the display screen image is switched, it is possible to easily find the numerical information for inputting a numerical value required by the user, from among the pieces of displayed information. As a result, the user can easily find the numerical information even when the screen image of operation console is switched, and confusion in the operation of inputting a numerical value or values can be prevented. The numerical information may include some symbols.

The apparatus as the object of control may operate in one operational mode selected by a user from a plurality of operational modes. Here, the display unit displays information corresponding to the selected operational mode. The display control unit may display the numerical information at the same position in each operational mode.

No matter whether the apparatus as the object of control operates in the first operational mode or the second operational mode selected by the user, the numerical information is displayed at the same position. Specifically, even when the operational mode is different, the numerical information allowing the user to input a numerical value (if the apparatus as the object of control is an image forming apparatus, the number of copies, copy magnification, the telephone number of transmission destination etc.) to be instructed to the apparatus as the object of control is always displayed at the same position. On the display panel of image forming apparatus as the object of control, the numeric keys for inputting a numerical value to be instructed to the image forming apparatus are displayed at the same position on the display panel both in the copy mode and the facsimile mode. Therefore, even when the operational mode is switched and the displayed screen image is changed accordingly, it is possible to easily find the numerical information required by the user from among the pieces of displayed information.

The numerical information may include a plurality of aligned numeric keys. The display control unit may display the numeric keys in the same arrangement in each operational mode.

By such an approach, it follows that the numeric keys of 1 to 9 are always displayed in the same arrangement (for example, in 3 rows by 3 columns, in ascending order from upper left to lower right position) even in different operational modes. Therefore, user operability can further be improved than when the numeric keys are simply displayed at the same position. As the numeric keys are displayed in the same arrangement, touch-typing is also possible.

The detecting unit may detect a user's request for inputting a numerical value. The display control unit may display, in response to the request for inputting a numerical value, the numerical information at the same position, regardless of the position where the request for inputting a numerical value is detected.

No matter whether input of numerical values in different operational modes (the number of copies, telephone number of transmission destination) is requested or input of numerical values in the same operational mode (the number of copies, copy magnification) is requested, the numerical information is displayed in response to the user pressing a software button displayed for requesting input of a numerical value. Here, even if software buttons requesting input of a numerical value related to the number of copies, copy magnification and the telephone number of transmission destination are displayed at different positions, the numerical information (ten-key) is displayed at the same position. Since the numeric keys are displayed at the same position regardless of the operational mode and the type of items of which input is requested, it is possible to easily find the numerical information for inputting a numerical value required by the user.

The display control unit may erase display of the numerical information in response to completion of input of a numerical value as an instruction to the apparatus as the object of control. Here, the completion of input is when a request for executing a process to the apparatus as the object of control is detected by the detecting unit.

After the instruction of a numerical value to the apparatus as the object of control is completed, a request is made to the apparatus as the object of control to execute a process. When the request to execute a process is detected, the display of numerical information is erased. Since the display of numerical information is automatically erased, user operation can be simplified. If the number of digits of the telephone number of transmission destination is fixed, the display of numerical information may be erased determining that input of the numerical value is completed when it is detected that a numerical value of the fixed number of digits has been input.

The display control unit may display at least one of the area for displaying the numerical information including a plurality of numeric keys and the numeric keys in the same size as before the display on the display unit is switched.

The numerical information including a plurality of numeric keys is displayed at the same position and, in addition, displayed in an area of the same size, or displayed with the numeric keys (software buttons) of the same size. Since the numerical information is displayed at the same position in the area of the same size, with software buttons of the same size arranged in the area, it is possible for the user to always operate the numeric keys with the same feeling.

The display unit and the detecting unit may constitute a touch-panel display.

Since the touch-panel display having a touch-panel as a detecting unit arranged on the display panel as a display unit is used, it is possible for the user to easily find the numeric keys displayed on the touch-panel display, even when the screen image on the touch-panel display is switched.

According to another aspect, the present invention provides an electronic device provided with the operation console described above. According to a still further aspect, the present invention provides an image processing apparatus provided with the above-described operation console.

In the electronic device and the image processing apparatus, it is possible for the user to easily find the numerical information for inputting a numerical value required by the user, since the numeric keys for inputting a numerical value as an instruction to the electronic device or the image processing apparatus are displayed at the same position even in different operational mode of the electronic device or different operational mode of the image processing apparatus (image forming apparatus).

According to the present invention, in an electronic device including an image processing apparatus (image forming apparatus) that operates switching among a plurality of operational modes, it is possible to easily find numerical information for inputting a numerical value required by the user, even when the operational mode is switched and screen image on the operation console is changed accordingly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
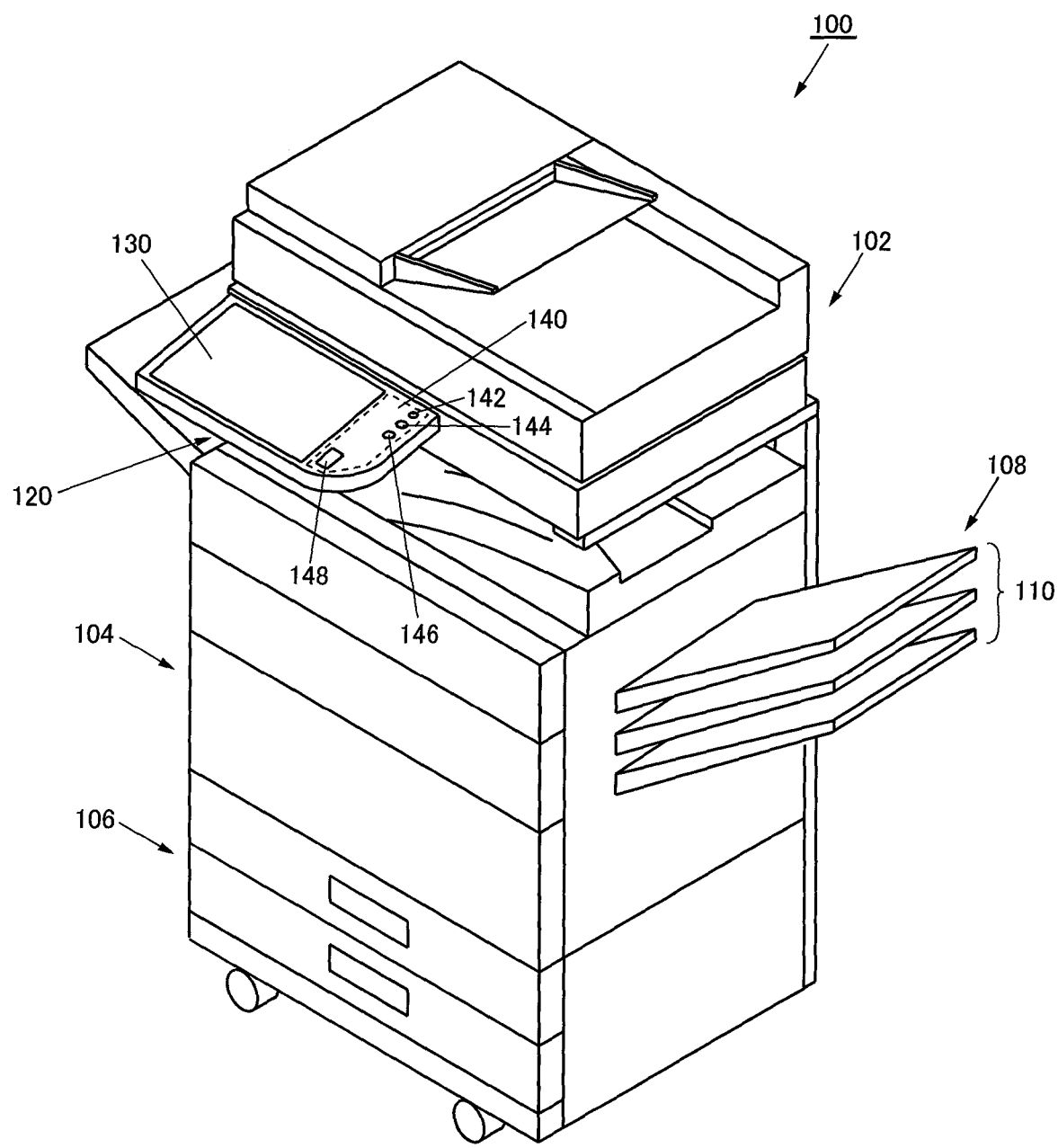
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The electronic device in accordance with an embodiment of the present invention is an image forming apparatus as one type of image processing apparatuses. The operation console in accordance with the present invention may be applicable to an image processing apparatus or an electronic device other than the image forming apparatus. The electronic device in accordance with the present embodiment may be any apparatus having a plurality of operational modes including an operation console displaying numerical information (numeric keys implemented by software buttons) such that the user can easily obtain the information for inputting a numerical value necessary for the user even when the user does not remember screen image configuration, when the operational mode of the device is switched and the screen image on the operation console is switched accordingly.

The image forming apparatus in accordance with the present embodiment includes a touch-panel display allowing operation by the gesture operation method and the touch-operation method not using the gesture operation. The apparatus, however, may include a touch-panel display allowing touch operation only.

The image forming apparatus forms an image on a sheet of recording paper by electro-photography. The image forming apparatus includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus may further include network printer mode. The present invention is not limited to the above, and it may be any image forming apparatus including at least two of the four operational modes, that is, copy mode, FAX mode, document filing mode and mail mode, in which screen image is switched for each mode. In the image forming apparatus, input of numerical values of 0 to 9, input of "clear" and input of some symbols are done by the user pressing software buttons displayed on the touch-panel display. In the image forming apparatus, information corresponding to the user's request for inputting a numerical value (numeric keys of 0 to 9, clear key and some symbol keys provided as software buttons) is always displayed at the same position on the touch-panel display, even in different operational modes. In the following, the software buttons including the numeric keys of 0 to 9, the clear key, and some symbol keys for designating a FAX transmission destination, will be generally referred to as "ten-key." The printing method is not limited to electro-photography.

[Image Forming Apparatus: Function]

Figure 2:
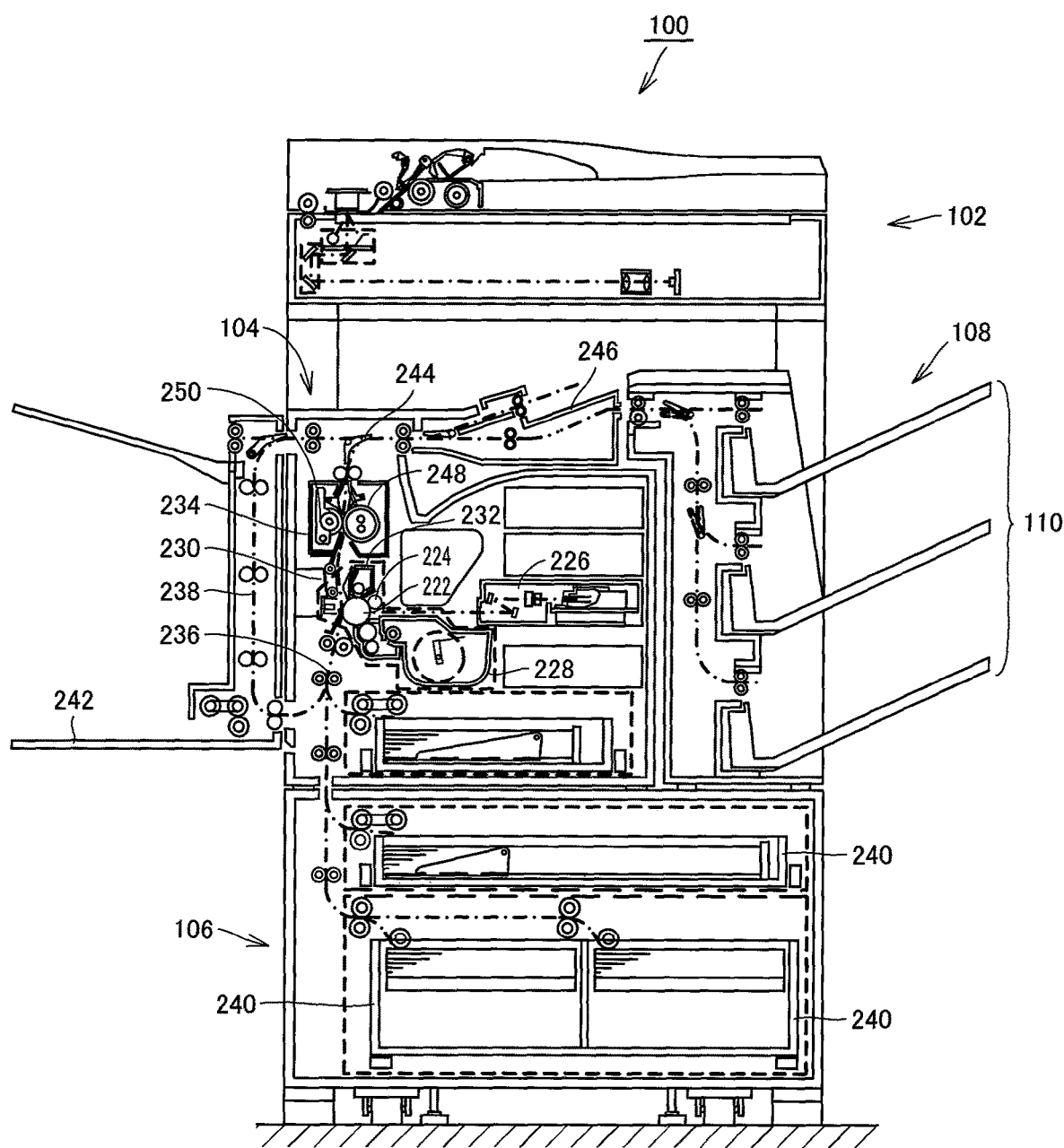
FIG. 2 schematically shows an internal configuration of the image forming apparatus shown in FIG. 1.
Figure 3:
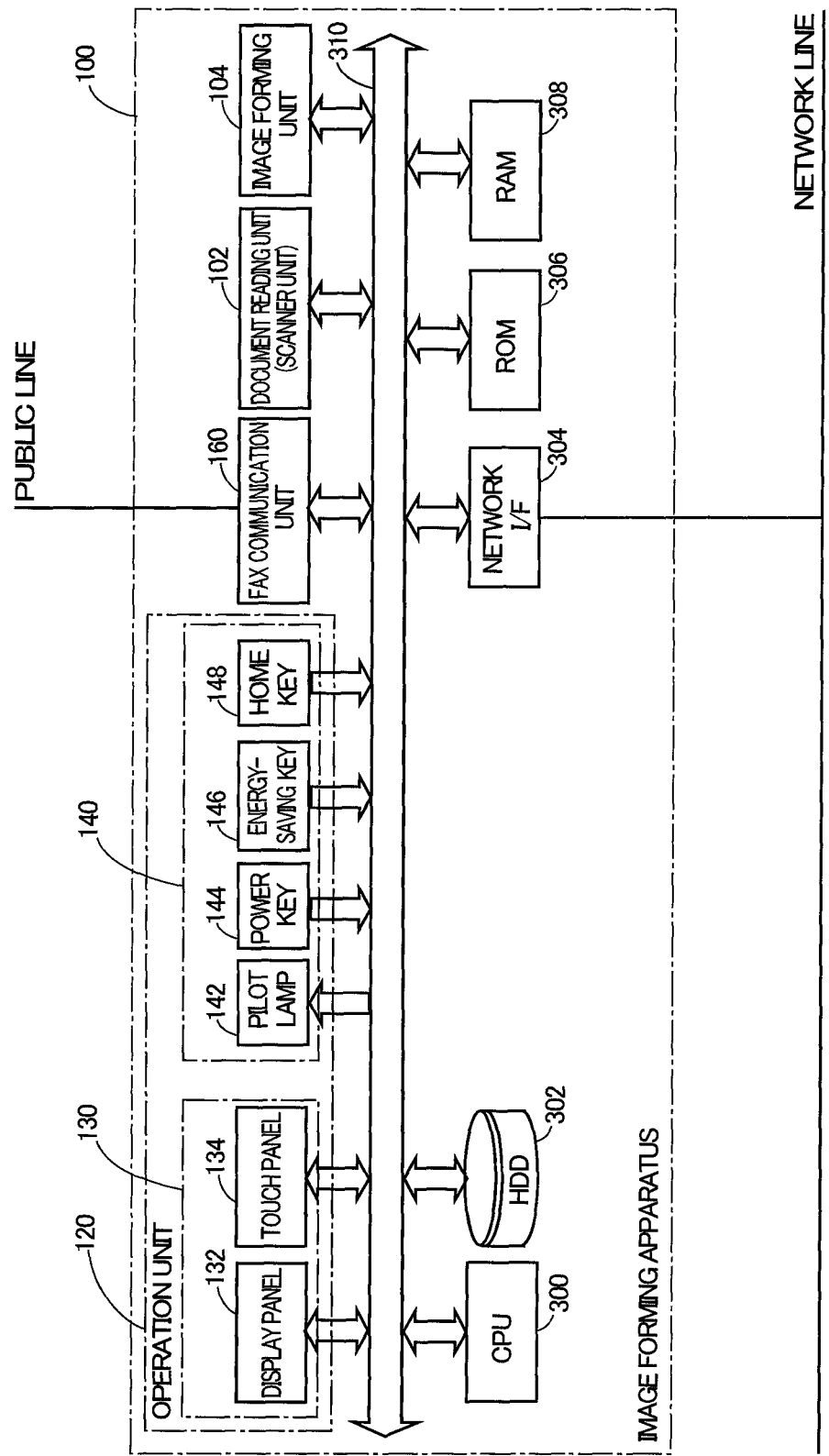
FIG. 3 is a functional block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 and a display operation unit 140. Touch-panel display 130 includes a display panel 132 formed of a liquid crystal panel or the like, and a touch-panel 134 arranged on display panel 132, for detecting a position pressed by the user's finger. Display operation unit 140 includes a pilot lamp 142, a power key 144, an energy-saving key 146, and a home key 148 for returning the display screen image on touch-panel display 130 to a home screen image for selection of an operational mode.

As described above, image forming apparatus 100 in accordance with the present embodiment is provided with touch-panel display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by touch-panel display 130. It is noted that image forming apparatus 100 is not limited to one having display operation unit 140 as such, and it may be provided only with touch-panel display 130. The invention is applicable to any apparatus in which the display is switched to an initial screen image of a selected operational mode, when the user selects the operational mode on the home screen image displayed on touch-panel display 130. The operational modes of image forming apparatus 100 as such will be described.

—Copy Mode—

In the following, an operation in the copy mode will be described. In the copy mode, mainly document reading unit (also referred to as a scanner unit) 102 and image forming unit 104 operate.

In image forming apparatus 100, a document placed on a platen is read by document reading unit 102 as image data. The read image data is input to CPU (Central Processing Unit) 300 implemented, for example, by a microcomputer shown in FIG. 3. The image data is subjected to various image processing operations here, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 and a pressure roller 250. Heating roller 248 is for heating the sheet of recording paper. Pressure roller 250 is for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

—Facsimile Mode—

In the following, an operation in the facsimile mode will be described. In the facsimile mode, the facsimile function is realized by transmission and reception operations. In the transmission operation, document reading unit (scanner unit) 102 and FAX communication unit 160 mainly operate. In the reception operation, FAX communication unit 160 and image forming unit 104 mainly operate.

—Transmission Operation—

In image forming apparatus 100, the facsimile mode is designated. A document placed on the platen is read by document reading unit 102 as image data. The read image data is input to CPU 300 implemented, for example, by a microcomputer shown in FIG. 3, the image data is subjected to various image processing operations here, and the resulting image data is output to a FAX communication unit (FAX communication unit 160 of FIG. 3).

FAX communication unit 160 of image forming apparatus 100 on the transmitting side connects a designated transmitting side line to a designated transmission destination. FAX communication unit 160 converts the image data to communication data in compliance with facsimile transmission standard, and transmits the converted data to a facsimile machine (such as an image forming apparatus having the facsimile function) on the receiving side.

—Communication Operation—

When the line is connected, a FAX communication unit of the image forming apparatus on the receiving side detects a communication request signal from FAX communication unit 160 of image forming apparatus 100 on the transmitting side, and transmits an acknowledgement signal. Thereafter, by way of example, FAX communication units on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image forming apparatus 100 on the transmitting side to the FAX communication unit of image forming apparatus on the receiving side. When transmission ends, the line is disconnected.

—Reception Operation

When image forming apparatus 100 is on the receiving side, FAX communication unit 160 converts the received data to image data and passes the data to an image forming unit 104. The received data may be converted to image data at the image forming unit 104. The image forming unit 104 prints an image of a document represented by the image data converted from the received data on a sheet of recording paper, in a manner similar to the operation in the copy mode described above.

—Document Filing Mode—

In the following, an operation in the document filing mode will be described. In the document filing mode, mainly document reading unit (scanner unit) 102 and image forming unit 104 operate.

In image forming apparatus 100, a document placed on the platen is read by document reading unit 102 as image data. The read image data is input to CPU 300 and subjected to various image processing operations here. The resulting image data is stored in a storage device (hard disk drive 302 as will be described later) provided in image forming apparatus 100.

The stored image data is read from the hard disk drive by the user designating the file name, and printed on a sheet of recording paper in the similar manner as in the copy mode described above.

—Mail Mode (Scan-to-Mail)—

In the following, description will be given on an operation in the mail mode. In the mail mode, document reading unit (scanner unit) 102 and network interface 304 mainly operate.

The image communication mode provided in image forming apparatus 100 includes the facsimile mode and the electronic mail communication mode (mail mode, scan-to-mail). In the facsimile mode, image data is transmitted/received by public line through FAX communication unit 160 as described above. In the electronic mail communication mode (mail mode, scan-to-mail), the image data is transmitted/received by the Internet line in the form of an attachment to an electronic mail, through network interface 304. Image forming apparatus 100 may further include Internet facsimile mode or image transfer mode (scan-to-PC folder). In the Internet facsimile mode, the image data is transmitted/received by the Internet line through network interface 304. In the image transfer mode (scan-to-PC folder), the image data is transferred to a folder of a specific personal computer (PC) using a network line.

In image forming apparatus 100, a document placed on a platen is read by document reading unit 102 as image data. The read image data is input to CPU 300, and subjected to various image processing operations here. The resulting image data is transmitted, attached to an electronic mail.

Different from the facsimile mode in which a telephone number of transmission destination is designated, a mail address of the transmission destination is designated in the mail mode.

[Image Forming Apparatus: Control Block Configuration]

Referring to FIG. 3, image forming apparatus 100 further includes operation unit 120, ROM (Read Only Memory) 306, a hard disk drive (hereinafter denoted as HDD) 302, and an RAM (Random Access Memory) 308. Operation unit 120 allows setting of functions related to the copy mode, facsimile mode, document filing mode and mail mode. ROM 306 stores programs and the like. HDD 302 is a non-volatile storage area capable of storing programs and data even when power is cut off. RAM 308 provides a storage area when a program is executed.

Image forming apparatus 100 further includes a bus 310 and CPU 300. Document reading unit 102, image forming unit 104, FAX communication unit 160, operation unit 120, ROM 306, HDD 302, RAM 308, and CPU 300 are connected to bus 310. CPU 300 realizes general functions as the image forming apparatus.

HDD 302 stores files of image data of documents scanned by image forming apparatus 100, folder by folder, together with date and time of saving and name of the user who saved. Further, HDD 302 stores initial screen image data of each operational mode.

ROM 306 stores programs and data necessary for controlling operations of image forming apparatus 100. The initial screen image data of each operational mode may be stored as data to be stored together with the program in ROM 306. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160 of image forming apparatus 100. To network interface 304, a network line is connected. To the network line, a computer or the like using image forming apparatus 100 as a network-supported printer may be connected. To the network line, a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, ROM 306, HDD 302, RAM 308 and touch-panel display 130 and display operation unit 140 forming operation unit 120, by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, touch-panel display 130 is provided on the left side area, and display operation unit 140 (pilot lamp 142 and power key 144, energy-saving key 146 and home key 148 as hardware buttons) is provided on the right side area. Touch-panel display 130 and display operation unit 140 form operation unit 120 as one integrated body as a whole.

As described above, touch-panel display 130 is formed of display panel 132 and touch-panel 134 arranged on display panel 132. On display panel 132 of touch-panel display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed, the pressed position is detected by the touch-panel 134. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 1402 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, in which every operational mode of image forming apparatus 100 is usable. In this state, pilot lamp 142 is turned and kept on. If a predetermined time passes without any user operation, or if the user presses energy-saving key 146, image forming apparatus 100 makes a transition from the normal mode to the energy saving mode. In the energy saving mode, only some of the operational modes of image forming apparatus 100 can be used. In this state, pilot lamp 142 flickers. Further, if the user presses energy-saving key 146 in the energy saving mode, the image forming apparatus 100 makes a transition from the energy saving mode to the normal mode. Home key 148 is a hardware key for returning the display of touch-panel display 130 to the initial state (home screen image). The processes performed when power key 144, energy-saving key 146 and home key 148 are pressed are not limited to the above.

In a hardware button (power key 144, energy-saving key 146 and home key 148) of display operation unit 140, a key lamp or key lamps, which is/are turned on/off (flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the four operational modes (copy mode, facsimile mode, document filing mode and mail mode) as described above. On touch-panel display 130, software buttons for setting functions in respective operational modes are displayed, and buttons for setting a destination or a preview as an expected image, for example, are displayed as needed.

In different operational modes, different screen images are displayed on touch-panel display 130. In order to allow the user to easily find a required piece of information even in such a state, touch-panel display 130 is divided into a plurality of areas (with the size of each area made variable), and pieces of information are displayed in these areas. More specifically, in image forming apparatus 100, if an operational mode is selected on the home screen image of touch-panel display 130 provided as a main display operation device, the initial screen image of each operational mode is displayed. In the initial screen image, a basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible (since the flow lines of the user's viewpoint and finger tip are similar to those in a conventional device not provided with such a large touch-panel display 130). Further, concepts of the pieces of information displayed on respective ones of the five areas are common among different operational modes, so that function setting operation and numerical value input operation by the user without any confusion become possible even in different operational modes. In the following, the arrangement of basic layout will be described.

[Basic Layout Arrangement]

Figure 4:
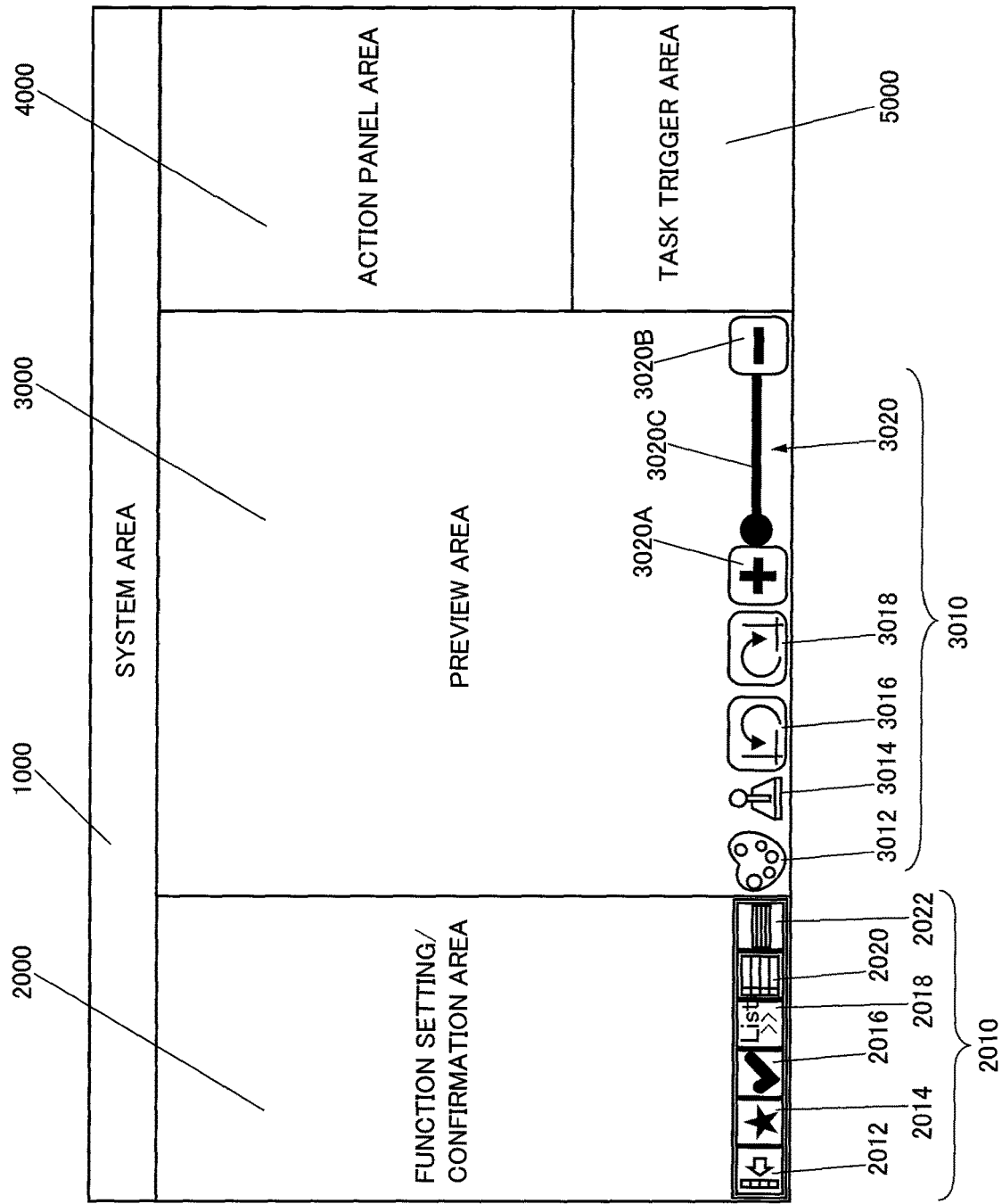
FIG. 4 shows display areas of a touch-panel display of the image forming apparatus shown in FIG. 1.

FIG. 4 shows a basic layout on touch-panel display 130 of image forming apparatus 100. Referring to FIG. 4, the basic layout of landscape-oriented touch-panel display 130 (for example, of 1024 pixels×600 pixels) includes system area 1000, preview area 3000, function setting/confirmation area 2000 (hereinafter referred to as function selecting area 2000), action panel area 4000 and task trigger area 5000. Specifically, system area 1000 is arranged at the uppermost portion of the screen image, and preview area 3000 is arranged at the center of the screen image. Function selecting area 2000 is placed on the left side of preview area 3000, and action panel area 4000 is placed on the right side of preview area 3000. Task trigger area 5000 is placed on the lower right side of preview area 3000. The number of areas is not limited to five, the arrangement on the left and right sides is not limited to the above, and the layout may be customized to facilitate user operation. For instance, system area 1000 may be positioned at the lowermost portion of the screen image.

On system area 1000, pieces of information related to the current status and state of image forming apparatus 100 are displayed. By way of example, on system area 1000, an operational mode name, an interruption key, a log-in user name, status of a currently processed job, state of use of an internal memory, time and the like are displayed.

On function selecting area 2000, a function selection menu (icons, buttons and the like) operated by the user for setting each function, switching display and confirming setting, is displayed. The manner of display of function selecting area 2000 is changed depending on whether it is in an icon mode, a regular mode or an express mode. In the icon mode, only the icons for setting functions are displayed in function selecting area 2000, so as to ensure the widest preview area 3000. In the express mode, a large screen image allowing setting of functions at one time is displayed in function selecting area 2000, while preview area 3000 is made the smallest. In the regular mode, the size of preview area 3000 is medium size between that in the icon mode and that in the express mode. In function selecting area 2000, function names are displayed in text, together with the icons for setting functions.

Switching among the icon mode, regular mode and express mode is done based on an operation by the user. Specifically, the size of preview area 3000 is changed in accordance with the user's operation. Since icons can transmit pieces of information to the user in a small area, it is preferred to prepare icons for all functions, so as to allow display of preview area 3000 in a large size.

At a lower portion of function selecting area 2000, a group of change buttons 2010 are provided, for changing style of display of function selecting area 2000. Among the group of change buttons 2010, an icon mode entering button 2012, a "favorite" button 2014, a check button 2016, a list button 2018, a regular mode entering button 2020, and an express mode entering button 2022 are provided. Icon mode entering button 2012 is for displaying function selecting area 2000 in the icon mode. Favorite button 2014 is for displaying functions registered as "favorites." Check button 2016 is for displaying a function of which setting has been changed. List button 2018 is for displaying a list of all functions that can be set in the selected operational mode. Regular mode entering button 2020 is for displaying function selecting area 2000 in the regular mode. Express mode entering button 2022 is for displaying function selecting area 2000 in the express mode.

If a large amount of information is to be displayed on function selecting area 2000, pieces of information are displayed in an upward/downward scrollable manner. In that case, the group of change buttons 2010 are not scrolled but constantly displayed at the lowermost portion of function selecting area 2000.

In preview area 3000, an image of expected document output (finished form) is displayed. Specifically, an image is displayed using dummy data or scanned data. Every time the user designates the manner of finish, the image displayed on preview area 3000 changes. Preview area 3000 has two display modes. One is a virtual mode before scanning, in which finished form of a dummy image is displayed. Another display mode is a scan-in mode after scanning, in which finished form of the actual image is displayed. The virtual mode has two types, that is, before setting an original document and after setting an original document.

At a lower portion of preview area 3000, a group of preview changing buttons 3010 are provided, for changing the style of display of preview area 3000. Among the group of preview changing buttons 3010, a left-turn button 3016, a right-turn button 3018, and a zoom bar 3020 are provided. Left-turn button 3016 turns the preview 90 degrees to the left, and right-turn button 3018 turns the preview 90 degrees to the right. In addition to these buttons, a color changing button 3012 and preview operation button 3014, for example, are provided.

When left-turn button 3016 is touch-operated once, the preview is turned 90 degrees to the left, and when touch-operated twice, the preview is turned 180 degrees to the left (vertically flipped). Similarly, when the image of finished document displayed on the preview area is gesture-operated (when the document image is rotated 180 degrees counter-clockwise by one's finger), the preview is turned 180 degrees to the left and vertically flipped.

When right-turn button 3018 is touch-operated once, the preview is turned 90 degrees to the right, and when touch-operated twice, the preview is turned 180 degrees to the right (vertically flipped). Similarly, when the image of finished document displayed on the preview area is gesture-operated (when the document image is rotated 180 degrees clockwise by one's finger), the preview is turned 180 degrees to the right and vertically flipped.

When a plus button 3020A of zoom bar 3020 is touch-operated or if bar 3020C is gesture-operated (slid) to the side of plus button 3020A, the preview is displayed in an enlarged size. Similarly, when the image of finished document displayed on the preview area is gesture-operated (when the document image is pinched-out/pinched-open by finger tips), the preview is displayed in an enlarged size.

When a minus button 3020B of zoom bar 3020 is touch-operated or if bar 3020C is gesture-operated (slid) to the side of minus button 3020B, the preview is displayed in a reduced size. Similarly, when the image of finished document displayed on the preview area is gesture-operated (when the document image is pinched-in/pinched-close by finger tips), the preview is displayed in a reduced size.

If the number of pages of the document image to be displayed on preview area 3000 is large, a display page selection button (a page number input button, page feed button, page return button, single page display button, plural page display button or the like) that can be touch-operated may be displayed. Page feed and page return of the previewed document is also possible by a gesture-operation (flick) of the document image. If the document image displayed on preview area 3000 is large, a scroll bar that can be touch-operated or gesture-operated may be displayed.

On action panel area 4000, pieces of information related to assistance, guidance and suggestion related to the operation are displayed. On action panel area 4000, if, for instance, a user selects a specific function, functions related to the selected function may be displayed, other functions related to the selected function in object-oriented manner may be displayed, or functions selected in the past by the user or a user of a group to which the user belongs in relation to the selected function may be displayed as "recommended functions."

On task trigger area 5000, trigger items operated by the user to actually operate image forming apparatus 100 when all settings are done for the operational mode are displayed. By way of example, a start button (software button) is displayed for starting a process. In an operational mode involving printing (other than facsimile transmission), information related to run out of consumables is also displayed on task trigger area 5000, since it leads to a task failure.

Here, it is preferred to display the start button only when the state allows pressing of the start button. The state that allows pressing of the start button refers to a state in which all settings have been done, and consumables (recording paper and toner) are available, in the operational mode involving printing. In the facsimile mode (transmission) as an operational mode not involving printing, it is a state in which settings of all transmission parameters including a destination have been done.

The positions where these five areas are arranged are not changed even when the operational mode is changed (not changed in the initial screen image of any operational mode). Similar to the switched display in the icon mode/ regular mode/express mode of function selecting area 2000 (and preview area 3000), the size of each area is changed, reduced/enlarged in the lateral direction (longitudinal direction) of touch-panel display 130.

These five areas are arranged in consideration of the flow line of user's viewpoint and the flow line of user's operation, in addition to the user interface of conventional devices. With such an arrangement, the user's viewpoint moves from upper left to lower right, and the user operation (finger tip of the dominant hand) moves from upper left to lower right. This advantageously enables a user-friendly operation.

In the present embodiment, when information is displayed to the user in areas divided in the above-described manner, the ten-key is displayed at the same position of the touch-panel display in the same arrangement, in the area of the same size and/or as the software buttons of the same size, even in different operational modes. Therefore, it is not necessary that the image forming apparatus 100 has touch-panel display 130 on which pieces of information are displayed divided in five areas as described above. The present invention is applicable to any image forming apparatus 100 in which the screen image on touch-panel display 130 is switched when operational mode is different.

For making a transition from one operational mode to another, home key 148 is pressed to display a home screen image, and thereby to select another operational mode on the home screen image. In this manner, the operational mode is switched through the home screen image.

Image forming apparatus 100 is provided with touch-panel display 130 displaying pieces of information in consideration of flow lines of user's viewpoint and user's operation. The display process on touch-panel display 130 is realized by software executed using the hardware configuration described above. The software configuration will be described.

[Software Configuration]

Figure 5:
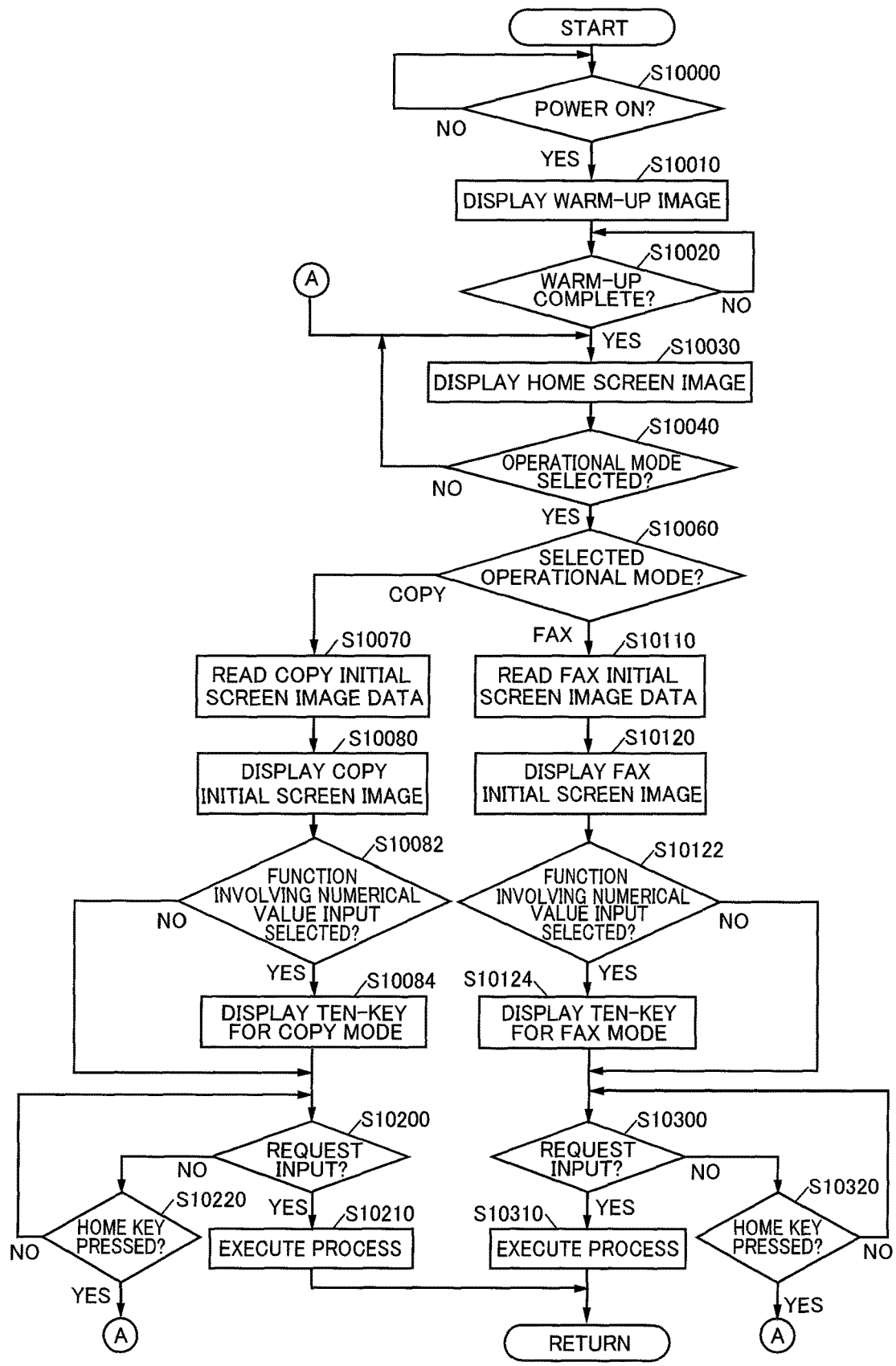
FIG. 5 is a flowchart representing a control structure of a program executed by the image forming apparatus in accordance with the embodiment of the present invention.

FIG. 5 is a flowchart representing a control structure of a program executed by CPU 300 of image forming apparatus 100. CPU 300 of image forming apparatus 100 executes, in parallel with the program, a program for realizing general functions of an image forming apparatus. The program, however, is not directly related to the characteristic portion of the present invention and, therefore, details thereof will not be described here. Of the four operational modes, only the copy mode and the FAX mode will be described in the following. It is noted, however, that image forming apparatus 100 operates not only in the copy mode and the FAX mode, and it is used with at least two operational modes switched. In both of the two operational modes, the ten-key area is displayed in the same size at the same position on touch-panel display 130. Further, keys of the same size are displayed in the same arrangement in the ten-key area.

Referring to FIG. 5, at step (hereinafter "step" will be denoted by S) 10000, CPU 300 of image forming apparatus 100 (hereinafter simply referred to as CPU 300) determines whether or not image forming apparatus 100 is powered on. Here, it is assumed that the main power for operating CPU 300 has been on, and when power key 144 is pressed, CPU 300 determines that image forming apparatus 100 is powered on. The determination of YES may be made if the main power is turned on, at S10000. If it is determined that image forming apparatus 100 is powered on (YES at S10000), the process proceeds to S10010. Otherwise (NO at S10000), the process of S10000 is repeated until it is determined that image forming apparatus 100 is powered on.

At S10010, CPU 300 displays a warm-up screen image on touch-panel display 130. While the warm-up screen image is displayed on touch-panel display 130, by way of example, a system check process and the process of supplying electric power to the heater to heat heating roller 248 are executed.

At S10020, CPU 300 determines whether or not warm-up is complete. If it is determined that warm-up is complete (YES at S10020), the process proceeds to S10030. Otherwise (NO at S10020), the process of S10020 is repeated until warm-up is complete.

At S10030, CPU 300 displays the home screen image on touch-panel display 130. At S10040, CPU 300 determines whether or not an operational mode is selected. CPU 300 determines that an operational mode is selected when an icon (an icon representing an operational mode) displayed on the home screen image is touched, tapped or double-tapped. If it is determined that an operational mode is selected (YES at S10040), the process proceeds to S10060. Otherwise (NO at S10040), the process returns to S10030, and the processes of S10030 and S10040 are executed. As to the icon operation, any gesture operation other than touching, tapping and double-tapping is not excluded. Any touch-operation or gesture-operation on touch-panel display 130 may be done. Simple description of "pressing" may refer to any of these operations.

At S10060, CPU 300 determines whether the selected operational mode is the copy mode or facsimile mode. If the selected operational mode is determined to be the copy mode (copy at S10060), the process proceeds to S10070. If the selected operational mode is determined to be the facsimile mode (FAX at S10060), the process proceeds to S10110.

At S10070, CPU 300 reads copy initial screen image data stored, for example, in HDD 302. At S10080, CPU 300 displays the initial screen image for the copy mode on touch-panel display 130 using the read copy initial screen image data.

At S10082, CPU 300 determines whether or not a function involving input of a numerical value is selected. By way of example, if a function for setting the number of copies is selected, or if a function for setting the copy magnification is selected, CPU 300 determines that the function involving input of a numerical value is selected. At this step, the function involving input of a numerical value is not limited to these two functions. If it is determined that the function involving input of a numerical value is selected (YES at S10082), the process proceeds to S10084. Otherwise (NO at S10082), the process proceeds to S10200.

At S10084, CPU 300 displays the ten-key for the copy mode on touch-panel display 130. Thereafter, the process proceeds to S10200.

At S10110, CPU 300 reads FAX initial screen image data stored, for example, in HDD 302. At S10120, CPU 300 displays the initial screen image for the FAX mode on touch-panel display 130 using the read FAX initial screen image data.

At S10122, CPU 300 determines whether or not a function involving input of a numerical value is selected. By way of example, if a function for inputting a telephone number of FAX transmission destination is selected, or a function involving input of a registered abbreviated number (single-touch number) is selected, CPU 300 determines that the function involving input of a numerical value is selected. At this step, the function involving input of a numerical value is not limited to these two functions. If it is determined that the function involving input of a numerical value is selected (YES at S10122), the process proceeds to S10124. Otherwise (NO at S10122), the process proceeds to S10300.

At S10124, CPU 300 displays the ten-key for the FAX mode on touch-panel display 130. Thereafter, the process proceeds to S10300.

At S10200, CPU 300 determines whether or not a request is input in the selected copy mode. If it is determined that a user request has been input (YES at S10200), the process proceeds to S10210. Otherwise (NO at S10200), the process proceeds to S10220.

At S10210, CPU 300 executes the process requested by the user in the copy mode, in image forming apparatus 100. Then, the process ends.

At S10220, CPU 300 determines whether or not the home key is pressed while the copy mode is selected. If it is determined that the home key is pressed (YES at S10220), the process proceeds to S10030. Otherwise (NO at S10220), the process returns to S10200 to determine whether or not a user request is input.

At S10300, CPU 300 determines whether or not a request is input in the selected FAX mode. If it is determined that a user request has been input (YES at S10300), the process proceeds to S10310. Otherwise (NO at S10300), the process proceeds to S10320.

At S10310, CPU 300 executes the process requested by the user in the FAX mode, in image forming apparatus 100. Then, the process ends.

At S10320, CPU 300 determines whether or not the home key is pressed while the FAX mode is selected. If it is determined that the home key is pressed (YES at S10320), the process proceeds to S10030. Otherwise (NO at S10320), the process returns to S10300 to determine whether or not a user request is input.

It is also possible to display a log-in screen image at the completion of warm-up (YES at S10020). Though the log-in operation after completion of warm-up is not described in the following, it is assumed that log-in is required of the user to use image forming apparatus 100.

Further, the request input by the user at S10200 or S10300 may be a request before printing that does not necessarily cause the actual printing by image forming apparatus 100. Specifically, the request may include a change in the display mode of function selecting area 2000, function setting on function selecting area 2000 (including input of a numerical value), and a change in the manner of displaying the preview on preview area 3000. If such a request before printing is made, corresponding operation is done at S10210 or at S10310, and after S10210 or S10310, the process returns to S10200 or S10300 to wait for an input of a further request (eventually the scan request, print request or transmission request).

[Operation]

The operation of image forming apparatus 100 in accordance with the present embodiment based on the configuration and flowchart as above will be described with reference to the exemplary displays on touch-panel display 130 shown in FIGS. 6 to 11.

—Home Screen Image Display Operation—

When the user presses power key 144 of image forming apparatus 100 (YES at S10000), the warm-up screen image is displayed on touch-panel display 130 (S10010) until warm-up is complete (NO at S10020). At this time, it is preferred that image forming apparatus 100 prepares pieces of information that can be displayed even during system check and useful for the user who is going to use image forming apparatus 100, and that the warm-up screen image including such pieces of information is displayed on touch-panel display 130.

Figure 6:
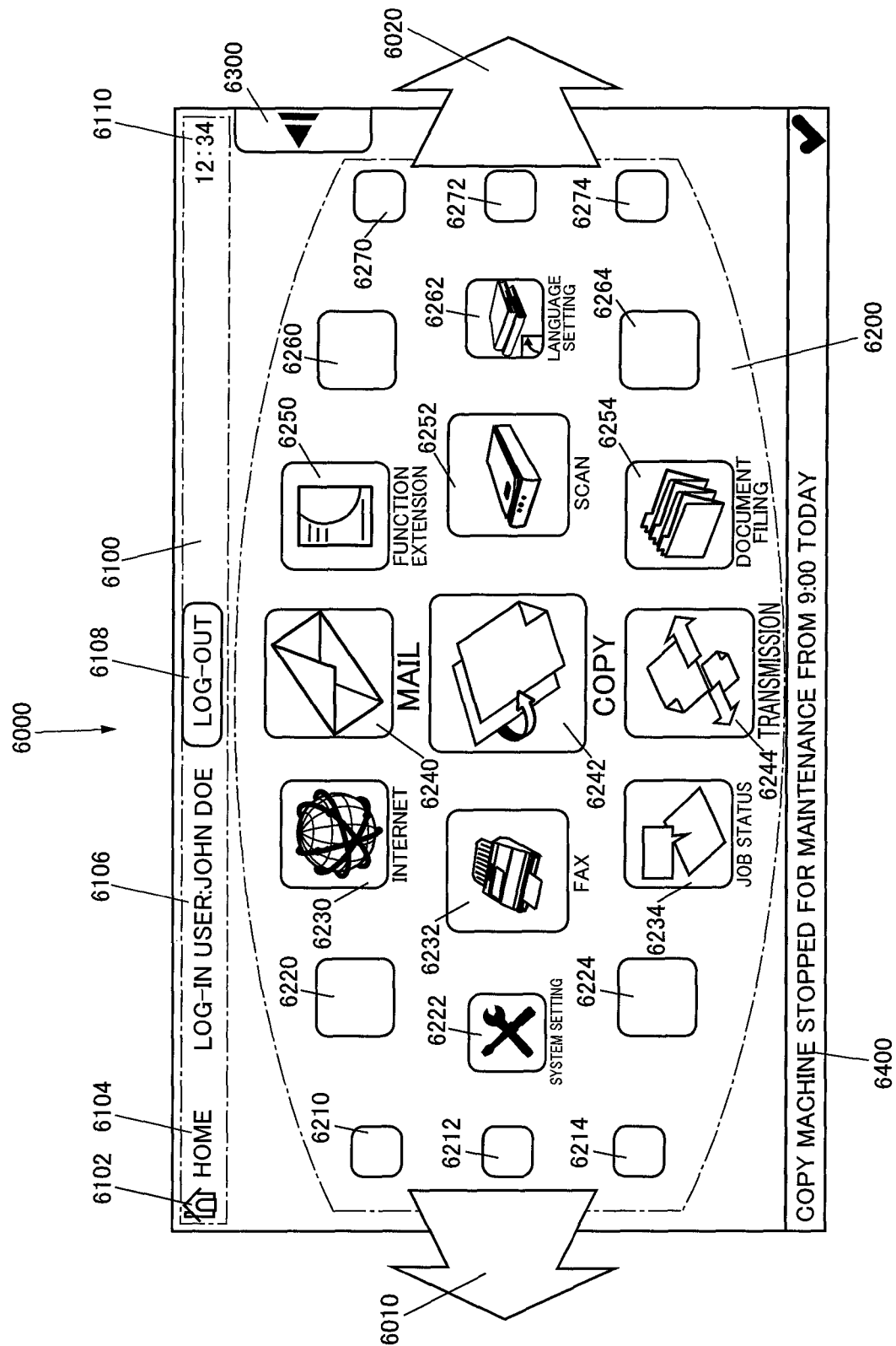
FIGS. 6 to 11 show exemplary screen images displayed on the touch-panel display of the image forming apparatus in accordance with the embodiment of the present invention.

When warm-up is complete (YES at S10020), the home screen image is displayed on touch-panel display 130 (S10030). At this time, on touch-panel display 130, a home screen image 6000 such as shown in FIG. 6 is displayed. On home screen image 6000, not all of the five areas of the layout described above are displayed. As shown in FIG. 6, on home screen image 6000, icons (icons representing operational modes) allowing selection of an operational mode are displayed on most part of touch-panel display 130, regardless of the five areas.

Referring to FIG. 6, home screen image 6000 includes a home system area 6100 corresponding to the system area described above, an icon display area 6200, an icon display switching tub-button 6300, and a memo display area 6400.

On home system area 6100, an area 6102 displaying an icon representing the home screen image, an area 6104 displaying the name of the displayed screen image, an area 6106 displaying the logged-in user name, an area 6108 displaying a log-out button (software button), and an area 6110 displaying the current time, are arranged.

On icon display area 6200, icons 6210-6274 representing operational modes are displayed together with the names or abbreviations of the operational modes. The name or abbreviation of the operational mode is not indispensable. In the present embodiment, there are at least four operational modes (copy mode, facsimile mode, document filing mode, and mail mode). Therefore, an icon 6242 for selecting the copy mode, an icon 6232 for selecting the facsimile mode, an icon 6254 for selecting the document filing mode and an icon 6240 for selecting the mail mode are displayed on icon display area 6200. In FIG. 6, icons for selecting other operational modes, icons for selecting other setting modes (for example, system setting and language setting), and icons for displaying other screen images (for example, job status) are also displayed.

As shown in FIG. 6, in icon display area 6200, icons on the central column (for example, icons 6240, 6242 and 6244) are displayed larger than icons on the left and right sides thereof (for example, icons 6230 and 6250 with respect to icon 6240, icons 6232 and 6252 with respect to icon 6242, and icons 6234 and 6254 with respect to icon 6244). In icon display area 6200, icons at the central row (for example, icons 6232, 6242 and 6252) are displayed larger than icons on the upper and lower sides thereof (for example, icons 6230 and 6234 with respect to icon 6232, icons 6240 and 6244 with respect to icon 6242, and icons 6250 and 6254 with respect to icon 6252). In this manner, in icon display area 6200, the icons are displayed to be horizontally and vertically symmetrical in size, with the size being the largest at the center (center at the central column).

When the user makes a flick operation to the left with his/her finger on icon display area 6200 displayed on the screen of touch-panel display 130, icons displayed on the screen move as if they flow in the direction indicated by an arrow 6010. When the user makes a flick operation to the right, icons displayed on the screen move as if they flow in the direction indicated by an arrow 6020. The distance of movement is determined, for example, in accordance with the width of movement of the finger tip in the flick operation. The distance of movement may be a prescribed distance set in advance for one flick operation. If a manner of display in which a plurality of icons are arranged on a virtual cylinder is adopted for icon display area 6200, it becomes possible to display the icons in an endless manner.

On memo display area 6400, a piece of maintenance information or the like to be notified to every user of image forming apparatus 100 is displayed.

—Operation of Displaying Initial Screen Image and Ten-Key Area in Copy Mode—

Figure 7:
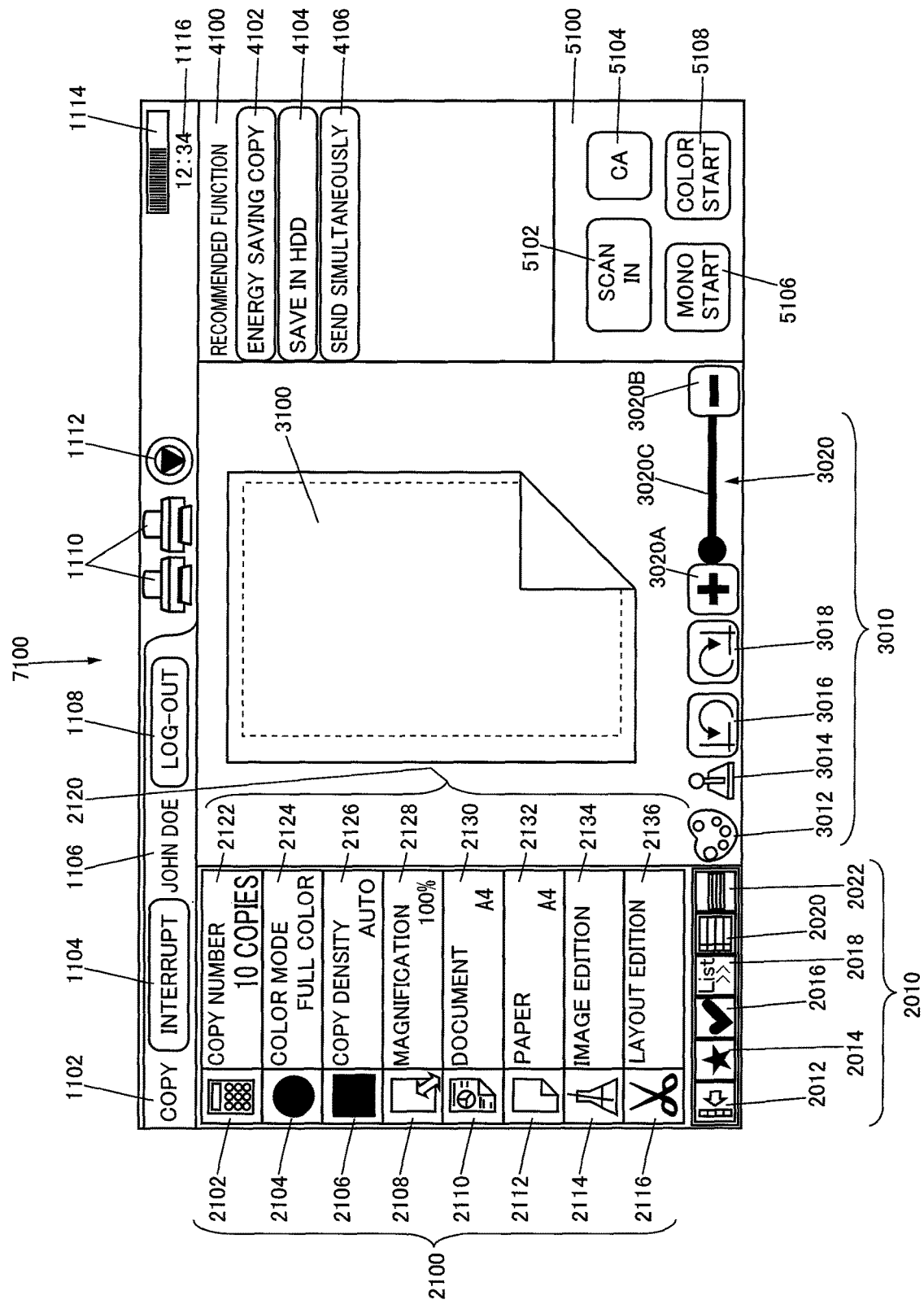

If icon 6242 shown in FIG. 6 is touched, tapped or double tapped by the finger tip of a user, it is determined that the operational mode is selected (YES at S10040), and that the selected operational mode is the copy mode (copy at S10060). Using the copy initial screen image data read from HDD 302 or the like, the initial screen image of copy mode is displayed on touch-panel display 130 (S10080). By way of example, an initial screen image 7100 for the copy mode shown in FIG. 7 is displayed on touch-panel display 130. As shown in FIG. 7, copy mode initial screen image 7100 is divided into five areas of the layout described above, on which pieces of information are displayed.

Referring to FIG. 7, on system area 1000 of copy mode initial screen image 7100, an area 1102 indicating the selected operational mode (here, copy mode), an area 1104 displaying sub information related to the selected operational mode, an area 1106 displaying the logged-in user name, an area 1108 displaying a log-out button (software button), an area 1110 displaying the job status of the currently executed job, an area 1112 displaying a button related to the job status (software button), an area 1114 displaying the communication state, and an area 1116 indicating the current time, are arranged.

In area 1102, a name and/or icon representing the operational mode is displayed. It is preferred that if area 1102 is touched, tapped or double-topped, a menu showing operational modes is pulled-down, allowing switching of the operational mode (the same applies to other operational modes).

In area 1104, an interruption key (software button) is displayed as sub information. If the interruption key is touched, tapped or double-tapped, an interruption process can be executed in the copy mode.

In area 1106, job status of the currently executed job is indicated by an icon. If the job status is touched, tapped or double-tapped, detailed information of job status is displayed. Further, it is preferred to display a button or the like to stop the selected job in area 1112.

In function selecting area 2000 of copy mode initial screen image 7100, a function selection menu allowing selection by the user in the copy mode and the group of change buttons 2010 described above are displayed. In the screen image shown in FIG. 7, the function selection menu is displayed in the regular mode.

As shown in FIG. 7, the function selection menu displayed in the regular mode includes a group of icons 2100 and a group of texts 2120. In the function selection menu displayed on function selecting area 2000, corresponding to an icon 2102 for setting the number of copies, a text 2122 showing the set contents is displayed. Corresponding to an icon 2104 for setting color mode, a text 2124 showing the set contents is displayed. Corresponding to an icon 2106 for setting copy density, a text 2126 showing the set contents is displayed. Corresponding to an icon 2108 for setting copy magnification, a text 2128 showing the set contents is displayed. Corresponding to an icon 2110 for setting document type, a text 2130 showing the set contents is displayed. Corresponding to an icon 2112 for setting paper type, a text 2132 showing the set contents is displayed. Corresponding to an icon 2114 for image edition, a text 2134 showing the set contents is displayed. Corresponding to an icon 2116 for layout edition, a text 2136 showing the set contents is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Here, image edition refers to image edition of one page of document. A lower layer menu thereof includes frame erasure, print menu, watermark, user stamp and the like. The layout edition refers to image edition of a plurality of pages of the document. The lower layer menu thereof includes page collection, margin, page movement, centering and the like. The lower layer menu of the displayed function selection menu appears on touch-panel display 130 if any of icons 2102 to 2116 or texts 2122 to 2136 is touched, tapped or double-tapped.

In preview area 3000 of copy mode initial screen image 7100, an image of expected document output (finished form) 3100 and the group of preview changing buttons 3010 described above are arranged. Here, image 3100 is displayed using dummy data or scanned data. Every time the user changes the function setting menu of function selecting area 2000, image 3100 is changed and displayed on preview area 3000 (preview display is changed).

In action panel area 4000 of copy mode initial screen image 7100, pieces of information related to assistance, guidance and suggestion related to the copy operation are displayed. As shown in FIG. 7, recommended functions in the copy mode selected by the user are displayed. In action panel area 4000, an area 4100 showing the contents of displayed information, and areas 4102 to 4106 showing, as texts, the recommended functions and serving as software buttons are arranged.

When area 4102 is touched, tapped or double-tapped, detailed information of energy-saving copy is pulled-down and displayed. Here, a software button allowing transition to a function setting screen image for double-sided copy is displayed, together with a text message of, for example, "double-sided copy saves paper." At the same time, a software button allowing transition to a function setting screen image for page collection is displayed, together with a text message of "collective printing of pages saves paper." Further, a software button allowing transition to a function setting screen image for saddle stitch is displayed, together with a text message of "printing for bookbinding available."

In task trigger area 5000 of copy mode initial screen image 7100, a group of execution buttons 5100 are displayed. The group of execution buttons 5100 includes a scan-in key 5102, a clear all key 5104, a monochrome start key 5106 and a color start key 5108. These are all software buttons. Scan-in key 5102 is for operating image forming apparatus 100 to scan a document and obtain image data. Clear all key 5104 is for clearing set function or functions.

Monochrome start key 5106 is for operating image forming apparatus 100 to scan a document and start copying in black and white. Color start key 5108 is for operating image forming apparatus 100 to scan a document and start color copying.

While the screen image shown in FIG. 7 is displayed on touch-panel display 130, if an icon 2102 for setting the number of copies or an icon 2108 for setting copy magnification displayed in function selecting area 2000 is touched or operated otherwise, it is determined that a function involving input of a numerical value is selected (YES at S10082). When the user makes such an operation, transition of the screen image displayed on touch-panel display 130 from the copy mode initial screen image 7100 shown in FIG. 7 to a ten-key display screen image 7110 shown in FIG. 8 occurs (S10084). It may be determined that a function involving input of a numerical value is selected, if a portion of text 2122 corresponding to icon 2102 or a portion of text 2128 corresponding to icon 2108, displayed on function selecting area 2000, is touched.

Figure 8:
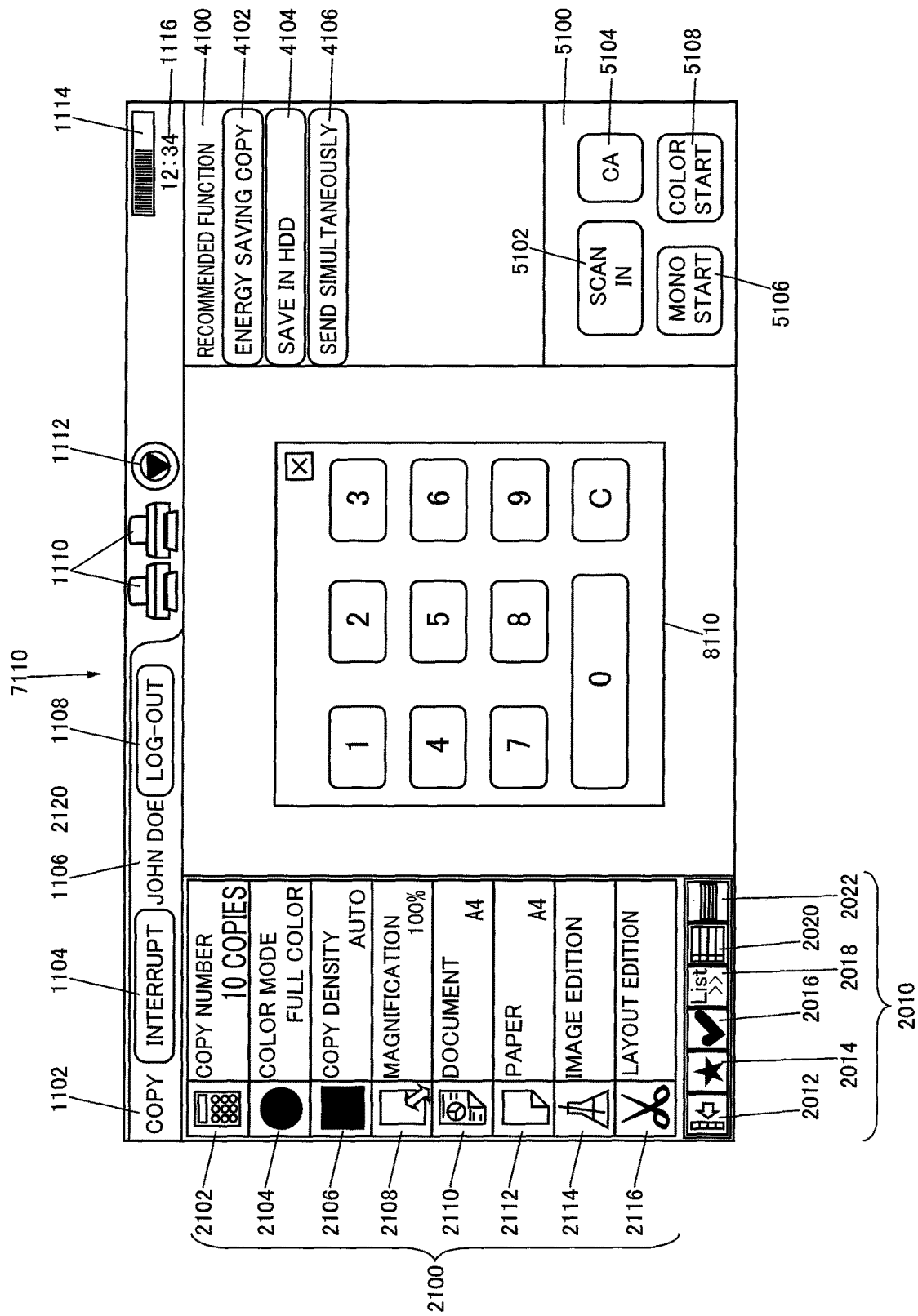

As shown in FIG. 8, ten-key area 8110 is displayed at the central portion (a portion corresponding to preview area 3000 of the five areas) of touch-panel display 130. The reason for this is that arrangement of ten-key area 8110 at the center facilitates its operation, and that necessity of confirming preview display is low while inputting a numerical value using the ten-key. Additional reason for displaying ten-key area 8110 in preview area 3000 arranged at the center of touch-panel display 130 is as follows.

The reason is that when a function that requires display of ten-key area 8110 is selected by function selecting area 2000 and a ten key of displayed ten-key area 8110 is operated, the display in function selecting area 2000 is changed. For instance, if the user touches "1" and "0" of ten-key area 8110 in this order to set the number of copies to ten (YES at S10200), text 2122 displaying the set contents of "number of copies" is changed from "0" to "10". Specifically, when "1" key in ten-key area 8110 is touched, the "number of copies" in text 2122 is changed from "0" to "1". When "0" in ten-key area 8110 is touched continuously, the "number of copies" in text 2122 is changed from "1" to "10". Such a change in display is also included in the process of S10210.

Another reason is that task trigger area 5000 must be kept displayed, in order to allow input of a request for executing the image forming process. When a group of execution buttons 5100 on task trigger area 5000 is operated by the user, ten-key area 8110 disappears and the image forming process is executed. If ten-key area 8110 is displayed at the center of touch-panel display 130, task trigger area 5000 can be kept displayed.

Since ten-key area 8110 is superposed on preview area 3000 in the similar manner as a multi-window, part of preview area 3000 may be hidden.

As shown in FIG. 8, on ten-key area 8110, ten keys including 0 to 9 as well as a clear key are displayed. In ten-key area 8110, numeric keys form 1 to 9 are arranged from upper left to lower right, in three rows by three columns. On the row next to the third row, a numeric key of 0 and the clear key are arranged. In the example of FIG. 8, the numeric key of 0 is shown larger than other keys. The key or keys displayed larger than other keys are not limited to the numeric key of 0.

Ten-key area 8110 shown in FIG. 8 disappears from touch-panel display 130, if the group of execution buttons 5100 in task trigger area 5000 is operated, as described above. In addition, the ten-key area disappears from touch-panel display 130 when a symbol "x" arranged at the upper right end of ten-key area 8110 is touched. The screen image of FIG. 8 makes a transition to the original screen image of FIG. 7 accordingly. It may also be possible to erase ten-key area 8110 by other touch or gesture operation and to make a transition to the original screen image shown in FIG. 7.

In this manner, the user inputs the number of copies by using the ten-key displayed in ten-key area 8110 and, thereafter, presses monochrome start key 5106 of the group of execution buttons 5100 in task trigger area 5000, whereby it is determined that the user has input a request (YES at S10200), and the monochrome copy process is executed in accordance with the request (S10210).

—Operation of Displaying Initial Screen Image and Ten-Key Area in FAX Mode—

Figure 9:
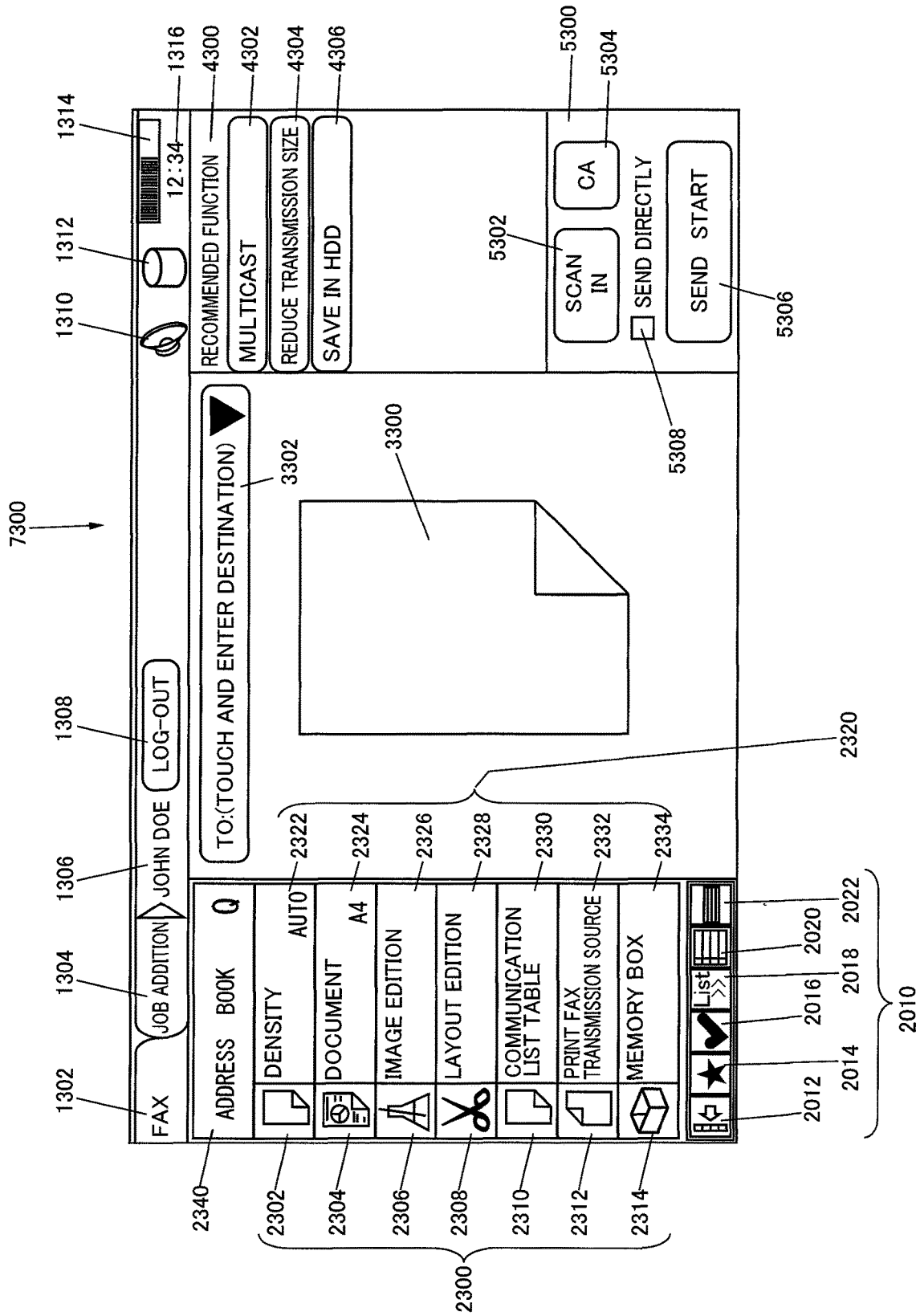

If icon 6232 shown in FIG. 6 is touched, tapped or double tapped by the finger tip of a user, it is determined that the operational mode is selected (YES at S10040), and that the selected operational mode is the FAX mode (FAX at S10060). Using the FAX initial screen image data read from HDD 302 or the like, the initial screen image of FAX mode is displayed on touch-panel display 130 (S10110). By way of example, an initial screen image 7300 for the FAX mode shown in FIG. 9 is displayed on touch-panel display 130. As shown in FIG. 9, FAX mode initial screen image 7300 is divided into five areas of the layout described above, on which pieces of information are displayed.

Referring to FIG. 9, on system area 1000 of FAX mode initial screen image 7300, an area 1302 indicating the selected operational mode (here, FAX mode), an area 1304 displaying sub information related to the selected operational mode, an area 1306 displaying the logged-in user name, an area 1308 displaying a log-out button (software button), an area 1310 displaying a volume adjustment button at the time of on-hook, an area 1312 displaying free memory space, an area 1314 displaying communication state, and an area 1316 indicating the current time, are arranged.

In area 1304, a key (software button) for adding a job is displayed, as the sub information. If the interruption key is touched, tapped or double-tapped, a process for designating a job to be added in the FAX mode can be executed.

When the volume adjustment button displayed in area 1310 is touched, tapped or double-tapped, a slide bar for adjusting volume at the time of on-hook is displayed.

In function selecting area 2000 of FAX mode initial screen image 7300, a function selection menu allowing selection by the user in the FAX mode and the group of change buttons 2010 described above are displayed. In the screen image shown in FIG. 9, the function selection menu is displayed in the regular mode.

As shown in FIG. 9, the function selection menu displayed in the regular mode includes a group of icons 2300 and a group of texts 2320. In the function selection menu displayed on function selecting area 2000, corresponding to an icon 2302 for setting the density of a FAX document, a text 2322 showing the set contents is displayed. Corresponding to an icon 2304 for setting the type of FAX document, a text 2324 showing the set contents is displayed. Corresponding to an icon 2306 for image edition, a text 2326 showing the set contents is displayed. Corresponding to an icon 2308 for layout edition, a text 2328 showing the set contents is displayed. For an icon 2310 for displaying result of FAX communication, corresponding text 2330 is displayed. For an icon 2312 for printing information of FAX transmission source on a FAX document, corresponding text 2332 is displayed. For an icon 2314 for displaying information stored in a memory box, corresponding text 2334 is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Further, in addition to the function selection menu, on function selecting area 2000 of FAX mode initial screen image 7300, a button 2340 for displaying an address book used to designate a telephone number of FAX destination is displayed.

When button 2340 is touched, tapped or double-tapped, from address books stored in image forming apparatus 100, only the destinations having FAX telephone numbers stored are extracted and a resulting address book is displayed, for example, in preview area 3000. In the state in which the address book is displayed in preview area 3000 (or address book may not be displayed), when a portion "Q" (meaning "quick") of button 2340 is touched, tapped or double-tapped, a single-touch number registered for identifying a FAX telephone number stored in the address book can be input.

In preview area 3000 of FAX mode initial screen image 7300, an image of expected document output (finished form) 3300 is arranged. Here, image 3300 is displayed using dummy data or scanned data. Every time the user changes the function setting menu of function selecting area 2000, image 3300 is changed and displayed on preview area 3000 (preview display is changed).

In addition to image 3300, in preview area 3000 of FAX mode initial screen image 7300, a button 3302 for inputting a FAX destination is displayed. When button 3302 is touched, tapped or double-tapped, a text input screen image is displayed, allowing direct input of a FAX destination, or selection of a FAX destination from an address book.

In action panel area 4000 of FAX mode initial screen image 7300, pieces of information related to assistance, guidance and suggestion related to the FAX operation are displayed. As shown in FIG. 9, recommended functions in the FAX mode selected by the user are displayed. In action panel area 4000, an area 4300 showing the contents of displayed information, and areas 4302 to 4304 showing, as texts, the recommended functions and serving as software buttons are arranged.

When area 4302 is touched, tapped or double-tapped, detailed information of multicast FAX transmission is pulled-down and displayed. When area 4304 is touched, tapped or double-tapped, detailed information related to an operation of reducing the size of data to be transmitted by FAX is pulled-down and displayed. When area 4306 is touched, tapped or double-tapped, detailed information related to an operation of saving a document to be transmitted by FAX in HDD 302 is pulled-down and displayed.

In task trigger area 5000 of FAX mode initial screen image 7300, a group of execution buttons 5300 are displayed. The group of execution buttons 5300 includes a scan-in key (software button) 5302, a clear-all key (software button) 5304, a transmission start key (software button) 5306 and a check box 5308. Scan-in key 5302 is a button for operating image forming apparatus 100 to scan a document and obtain image data. Clear all key 5304 is a button for clearing set function or functions. Transmission start key 5306 is a button for operating image forming apparatus 100 to scan a document and transmit it by FAX. Check box 5308 is used for designating direct transmission.

While the screen image shown in FIG. 9 is displayed on touch-panel display 130, if the portion "Q" of button 2340 displayed in function selecting area 2000 or a button 3302 for inputting FAX destination displayed in preview area 3000 is touched or otherwise operated, it is determined that a function involving input of a numerical value is selected (YES at S10122). If such an operation is done by the user, the screen image displayed on touch-panel display 130 makes a transition from FAX mode initial screen image 7300 shown in FIG. 9 to ten-key display screen image 7310 shown in FIG. 10 (S10124).

Figure 10:
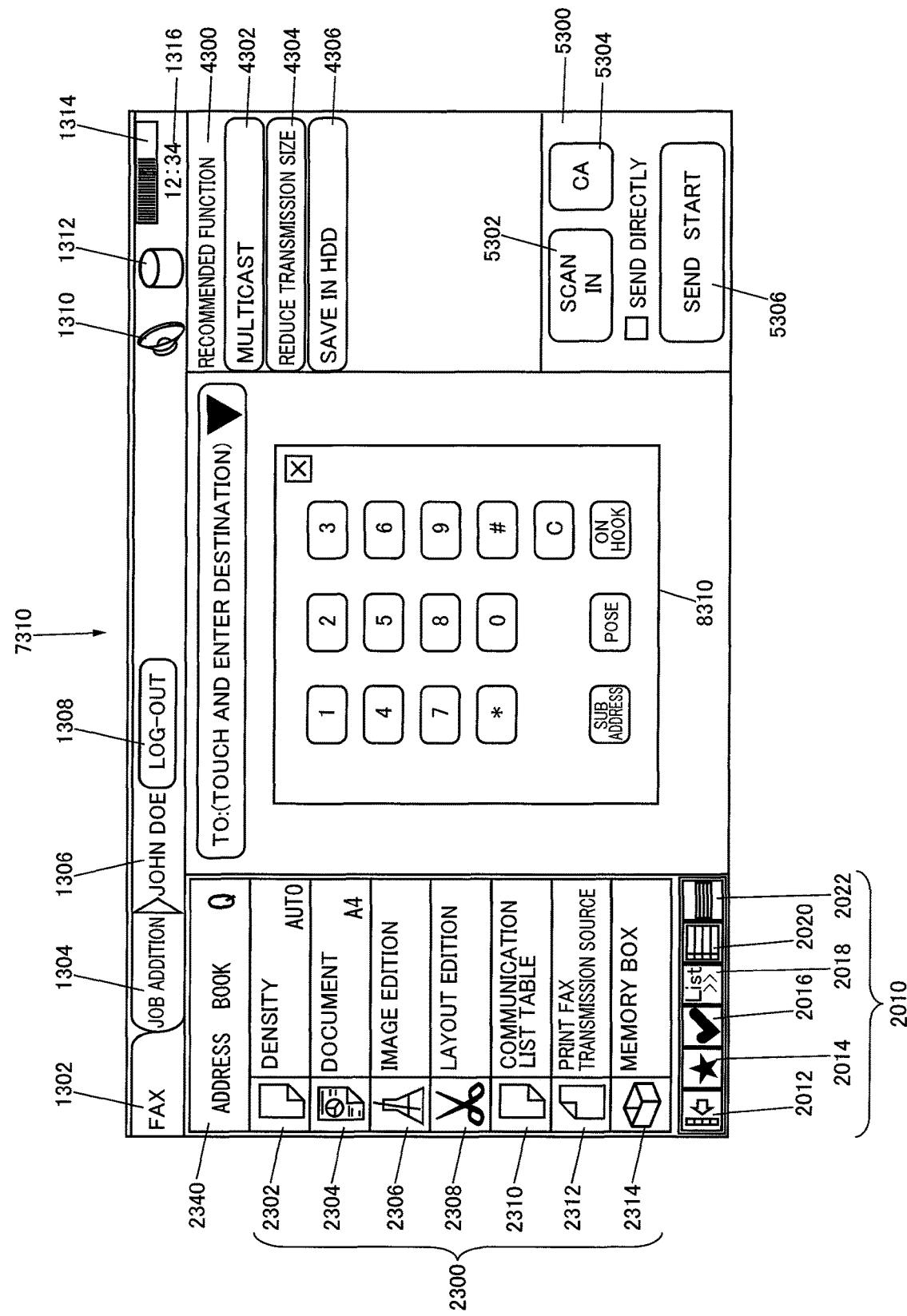
Figure 11:
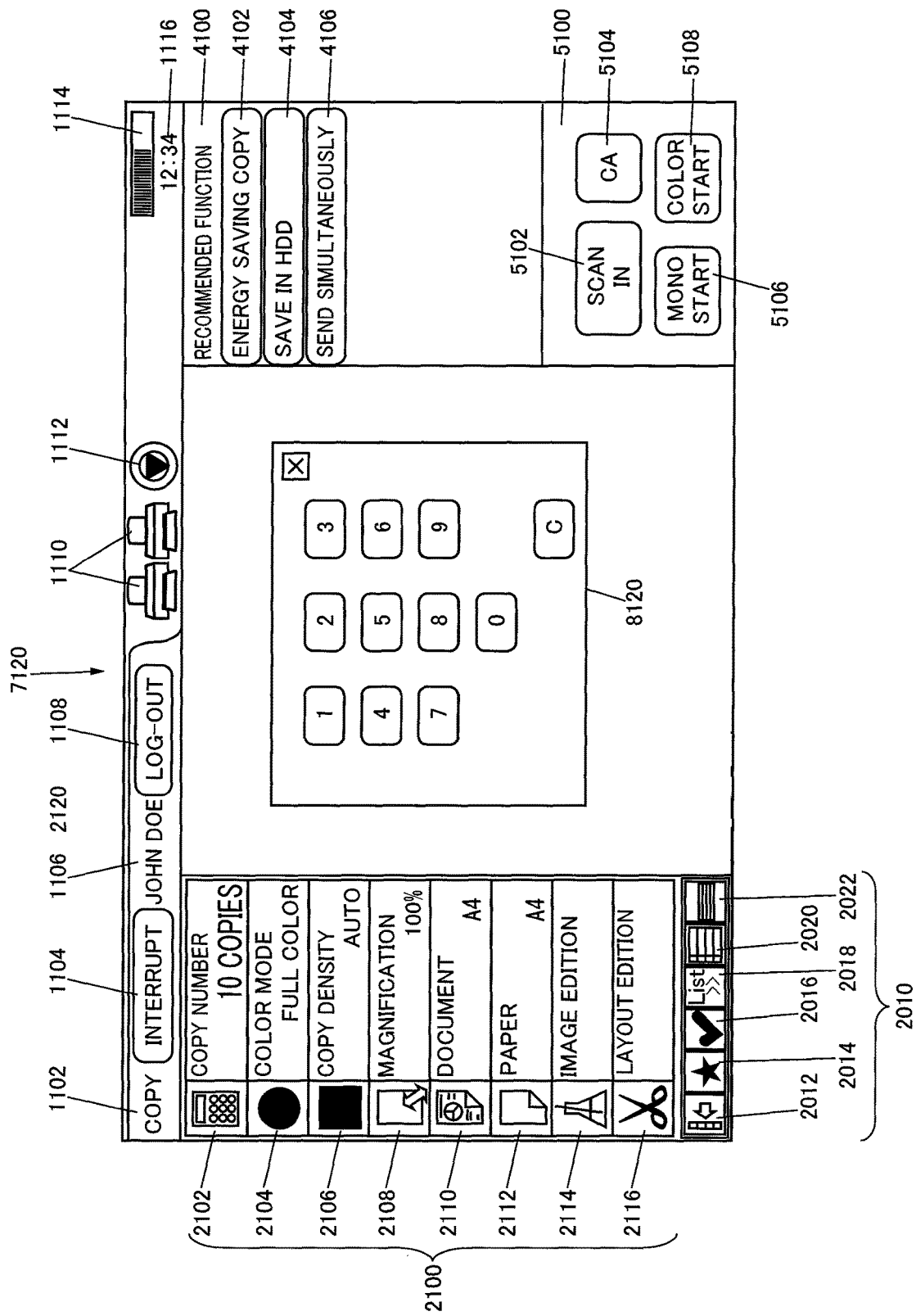

As shown in FIG. 10, ten-key area 8310 is displayed in the same size and at the same position on touch-panel display 130 as ten-key area 8110 described above. Assume, for example, that the upper left end of touch-panel display is the origin of a two-dimensional coordinate system (X (width): 0-1023, Y (length): 0-599). Then, the coordinates of the upper left end of ten-key area 8110 are the same as the coordinates of the upper left end of ten-key area 8310, and the coordinates of the lower right end of ten-key area 8110 are the same as the coordinates of the lower right end of ten-key area 8310. The reason why ten-key area 8310 is arranged at the central portion on touch-panel display 130 is the same as for ten-key area 8110. Similar to ten-key area 8110, ten-key area 8310 is also superposed on preview area 3000 like a multi-window. Further, ten-key area 8310 disappears at the similar timings as ten-key area 8110 described above.

As shown in FIG. 10, in ten-key area 8310, in addition to ten keys of 0 to 9 and the clear key, "*" key, "#" key, "SUB ADDRESS" key, "POSE" key, and "ON HOOK" key are displayed. The arrangement (order) of numeric keys 1 to 9 in ten-key area 8310 is the same as that in ten-key area 8110.

"SUB ADDRESS" means a delimiter of FAX number (a box is designated following this mark), "POSE" means providing a prescribed time interval, "ON HOOK" means input of a number with the line connected, and "*" and "#" represent symbols for designating a box.

In this manner, the user inputs the FAX telephone number or single-touch number using the ten-key displayed in ten-key area 8310, and thereafter, presses a transmission start key 5306 of the group of execution buttons 5300 in task trigger area 5000. Thus, it is determined that the user has input a request (YES at S10300), and the FAX transmission process is executed in accordance with the request (S10310).

Ten-key area 8310 is also displayed on touch-panel display 130 when a FAX number or the like is registered with the address book (including registration of single-touch number).

—Comparison of Ten-Key Areas in Two Modes—

As described above, from the comparison of ten-key area 8110 (FIG. 8) in the copy mode and ten-key area 8310 (FIG. 10) in the FAX mode, it can be seen that these areas are displayed in the same size (having the same area size) at the same position on touch-panel display 130. Further, the order of numeric keys 1 to 9 is the same (arranged in 3 rows by 3 columns, in ascending order from 1 to 9 from upper left to lower right position). As described above, (though the keys in FAX mode are smaller since the number of keys is larger and the priority is given to have the same area size) ten-key areas 8110 and 8310 are displayed at the same position, and in the areas, numeric keys are displayed in the same arrangement, though the operational mode of image forming apparatus 100 is different. Therefore, it is possible for the user to operate the ten-key area always in the same manner. The user can input numerical value or values quickly without confusion when he/she uses the ten-key (without the necessity to search and find the position of ten-key area). Further, the user can input by touch-typing, without confusion in finding the position of numeric keys (without the necessity to search and find where the numeric key to be touched is positioned).

Priority may be given to having the keys made the same size, rather than having the areas made the same size. By way of example, ten-key area 8110 in the copy mode (FIG. 8) may be modified to ten-key area 8120 shown in FIG. 11.

From the comparison between ten-key area 8310 (FIG. 10) in the FAX mode and ten-key area 8120 (FIG. 11) in the copy mode, it can be seen that in ten-key area 8120, five keys ("*" key, "#" key, "SUB ADDRESS" key, "POSE" key and "ON HOOK" key) of ten-key area 8310 are omitted and the area size is made smaller. By such an approach, the size of each numeric key and the position on touch-panel display 130 come to be the same, so that convenience to the user can further be improved. Specifically, nine numeric keys of 1 to 9 (software buttons) are arranged on the same coordinate points in the same size, in the two-dimensional coordinate system having the upper left end of touch-panel display 130 as the origin.

As described above, the ten-key area is displayed in the same size even in different operational mode, and/or the keys of the same size are displayed in the area. Further, the ten-key area is displayed at the same position substantially at the center of touch-panel display 130, in which area the ten-key is displayed in the same arrangement.

[Effects]

As described above, in the image forming apparatus in accordance with the present embodiment, different initial screen images are displayed on the touch-panel display when operational modes are switched. Here, the touch-panel display is divided into a plurality of display areas, and pieces of information having common concepts are displayed in each of the divided areas. Therefore, it is possible for the user to easily find a necessary piece of information, whereby operability can be improved.

Specifically, in the initial screen image, the basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible in each mode. Since the flow lines of the user's viewpoint and finger tip similar to those in a conventional device not provided with such a large touch-panel display 130 (having a group of hardware buttons including ten or more keys on the touch-panel display) are realized, confusion of the user can be prevented even when image forming apparatus is changed from a conventional one to the apparatus in accordance with the present embodiment. Further, concepts of the pieces of information displayed on respective ones of the five areas are common among different operational modes, so that smooth operation by the user without any confusion becomes possible even in different operational modes. Particularly, the ten-key area for inputting a numerical value and the like is always displayed at the same position on a touch-panel display, and the ten keys are always displayed in the same arrangement in that area. Further, the ten-key area is displayed in the same size, and/or keys of the same size are displayed inside the area. Thus, confusion of the user when he/she inputs a numerical value can be prevented.

The ten-key area is displayed at the same position, including keys of the same arrangement therein, in different operational modes as described above. Further, the ten-key area may be displayed at the same position, including keys of the same arrangement therein, even when different functions are to be set in the same operational mode. By way of example, in the copy mode, the ten-key area displayed when the number of copies is to be input and the ten-key area displayed when the copy magnification is to be input are displayed at the same position in the same size.

As described above, the types of keys displayed in the ten-key area differ depending on the operational mode and/or differ depending on the symbols that can be input even in the same operational mode. In the present embodiment, at least the numeric keys of 0 to 9 and the clear key are always included in the ten-key area in any case.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an image forming apparatus capable of forming an image on a sheet of recording paper, comprising:
   a display unit displaying information to be notified to a user;
   a detecting unit, arranged on said display unit, for detecting a request of the user based on a touch operation of the user;
   a display control unit displaying, on said display unit, a ten-key allowing the user to input, using said detecting unit, a numerical value as an instruction to said image forming apparatus; wherein
      said detecting unit detects a request for inputting a numerical value for setting a condition for an operational mode of said image forming apparatus; and
      said display control unit displays said ten-key on said display unit in response to said request for inputting a numerical value, and in accordance with said operational mode of said image forming apparatus, changes the size of numerical keys of said ten key,
   said operational mode includes a FAX mode and a copy mode; and
   responsive to switching of said operational mode from said copy mode to said FAX mode, said display control unit switches display on said display unit from a screen image of said copy mode to a screen image of said FAX mode, and on the screen image of said FAX mode, changes and displays the size of said numerical keys to be smaller, and displays keys not displayed in said copy mode in a size different from the size of said numerical keys before the change.

2. The operation console according to claim 1, wherein said ten-key is displayed superposed on said information to be notified to the user.

3. The operation console according to claim 1, wherein said display control unit displays said ten-key at the same position on said display unit, even when display on said display unit is switched.

4. The operation console according to claim 1, wherein said display unit displays information corresponding to an operational mode selected by the user in one same layout irrespective of said selected operational mode; and
   said layout has
   a preview area arranged at a central area of said display unit, for displaying an image as an object of processing of said image forming apparatus, a function selecting area placed on the left side of said preview area, for displaying icons for setting conditions related to said selected operational mode and set conditions in an associated manner, and a task trigger area placed on the lower right side of said preview area, for displaying a key to instruct execution of a process to said image forming apparatus.

5. The operation console according to claim 1, wherein in response to an input of a numerical value through said ten-key, said display unit displays the numerical value as said set condition.

6. The operation console according to claim 1, wherein said ten-key includes a plurality of numeric keys arranged in an array and a clear key arranged outside a circumscribed rectangle of said plurality of numeric keys.

7. The operation console according to claim 1, wherein said ten-key includes a plurality of numeric keys arranged in an array;

said operational mode is one of a plurality of operational modes related to printing and said display unit displays said numeric keys in the same array in each of the operational modes related to printing.

8. The operation console according to claim 1, wherein said display control unit erases display of said ten-key in response to completion of input of a numerical value as an instruction to said image forming apparatus.

9. The operation console according to claim 8, wherein the completion of input is when a request for executing a process to said image forming apparatus is detected by said detecting unit.

10. The operation console according to claim 1, wherein said display control unit displays the area for displaying the ten-key including a plurality of numeric keys in the same size as before the display on said display unit is switched.

11. The operation console according to claim 8, wherein said display unit and said detecting unit constitute a touch-panel display.

12. An electronic device provided with the operation console according to claim 1.

13. An image forming apparatus provided with the operation console according to claim 1.

14. A method of displaying information on an operation console provided on an image forming apparatus capable of forming an image on a sheet of recording paper, comprising:

a display step of displaying, on a display panel, information to be notified to a user;

a detecting step of detecting, using a touch-panel arranged on said display panel, a request of the user based on a touch operation of the user;

a display control step of displaying, on said display panel, a ten-key allowing the user for inputting, using said touch-panel, a numerical value as an instruction to said image forming apparatus; wherein said detecting step includes a step of detecting a request for inputting a numerical value for setting conditions of an operational mode of said image forming apparatus; and said display control step includes a step of displaying, in response to said request for inputting a numerical value, said ten-key at a central area of said display panel, and, in accordance with said operational mode of said image forming apparatus, changing the size of numerical keys of said ten key, said operational mode includes a FAX mode and a copy mode; and responsive to switching of said operational mode from said copy mode to said FAX mode, said display control step switches display on said display panel from a screen image of said copy mode to a screen image of said FAX mode, and on the screen image of said FAX mode, changes and displays the size of said numerical keys to be smaller, and displays keys not displayed in said copy mode in a size different from the size of said numerical keys before the change.

15. The operation console according to claim 1, wherein an area in which said ten-key is displayed on said display unit is not changed in position even when said operational mode is changed.

16. The operation console according to claim 1, wherein an area in which said ten-key is displayed on said display unit is not changed in size even when said operational mode is changed.

17. The operation console according to claim 1, wherein said display control unit changes a type of key or types of keys other than said numerical keys, in accordance with said operational mode.

18. The operation console according to claim 1, further including a preview area for displaying, before an image is formed on the recording paper by said image forming apparatus, said image as a preview image arranged at the central area of said display unit; wherein said ten key is displayed over said preview area.

19. The operation console according to claim 1, wherein said request for inputting a numerical value includes a request for inputting a number of copies or a request for inputting a copy magnification; and when said operational mode is a FAX mode, said request for inputting a numerical value includes a request for inputting a FAX destination.

* * * * *